(12) United States Patent
Ouchi et al.

(10) Patent No.: US 10,798,683 B2
(45) Date of Patent: Oct. 6, 2020

(54) TERMINAL APPARATUS AND METHOD

(71) Applicants: Sharp Kabushiki Kaisha, Sakai, Osaka (JP); FG Innovation Company Limited, New Territories (HK)

(72) Inventors: Wataru Ouchi, Sakai (JP); Shoichi Suzuki, Sakai (JP); Liqing Liu, Sakai (JP); Tomoki Yoshimura, Sakai (JP); Takashi Hayashi, Sakai (JP); Tatsushi Aiba, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 125 days.

(21) Appl. No.: 16/300,629

(22) PCT Filed: May 9, 2017

(86) PCT No.: PCT/JP2017/017519
§ 371 (c)(1),
(2) Date: Nov. 12, 2018

(87) PCT Pub. No.: WO2017/195769
PCT Pub. Date: Nov. 16, 2017

(65) Prior Publication Data
US 2019/0289586 A1 Sep. 19, 2019

(30) Foreign Application Priority Data
May 12, 2016 (JP) .................................. 2016-096128

(51) Int. Cl.
*H04W 4/00* (2018.01)
*H04W 72/04* (2009.01)
(Continued)

(52) U.S. Cl.
CPC ....... *H04W 72/0406* (2013.01); *H04L 5/0055* (2013.01); *H04L 5/1469* (2013.01);
(Continued)

(58) Field of Classification Search
CPC . H04W 72/0406; H04W 72/04; H04W 28/04; H04W 88/02; H04L 5/0055; H04L 5/1469; H04L 27/2602; H04L 1/1854
See application file for complete search history.

(56) References Cited

U.S. PATENT DOCUMENTS

2017/0118745 A1   4/2017   Nogami et al.

FOREIGN PATENT DOCUMENTS

WO        2015/115454 A1   8/2015

OTHER PUBLICATIONS

Ericsson ( R1-163324, Short TTI operation with Carrier aggregation, Busan, Apr. 11-15, 2016) (Year: 2016).*
(Continued)

*Primary Examiner* — Maharishi V Khirodhar
(74) *Attorney, Agent, or Firm* — ScienBiziP, P.C.

(57) ABSTRACT

Provided is a terminal apparatus including a receiver that can receive a PSDCH and a transmitter that can transmit an HARQ-ACK for the PDSCH by use of a PUCCH. In the terminal apparatus, the transmitter shortens a timing for transmitting the HARQ-ACK for the PDSCH based on a prescribed TTI length configured for the PDSCH, and a PUCCH format to transmit the HARQ-ACK is determined based on the TTI length of the PDSCH and the TTI length of the PUCCH.

6 Claims, 7 Drawing Sheets

(51) Int. Cl.
- *H04L 5/00* (2006.01)
- *H04L 5/14* (2006.01)
- *H04L 27/26* (2006.01)
- *H04W 28/04* (2009.01)
- *H04W 88/02* (2009.01)

(52) U.S. Cl.
CPC ......... *H04L 27/2602* (2013.01); *H04W 28/04* (2013.01); *H04W 72/04* (2013.01); *H04W 88/02* (2013.01)

(56) References Cited

OTHER PUBLICATIONS

Huawei (R1-162111, "Discussion on DL HARQ timing for short TTI", Busan, Korea Apr. 11-15, 2016) (Year: 2016).*

Lenovo ( R1-162739, "Design of UL channels for shortened TTI", Busan, Korea, Apr. 11-15, 2016), (Year: 2016).*

Interdigital (R1-162965, Short TTI PUCCH Design, Busan, Korea Apr. 11-15, 2016) (Year: 2016).*

InterDigital; "Short TTI PUCCH Design"; 3GPP TSG RAN WG1 Meeting #84bis; R1-162965; Apr. 11-15, 2016; 3 pages.

Official Communication issued in International Patent Application No. PCT/JP2017/017519, dated Aug. 1, 2017.

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, pp. 1-86.

Ericsson, "Short TTI operation with Carrier Aggregation", 3GPP TSG RAN WG1 Meeting #84bis, R1-163324, Apr. 11-15, 2016, pp. 1-3.

Huawei et al., "Short TTI for DL transmissions", 3GPP TSG RAN WG1 Meeting #84, R1-160292, Feb. 15-19, 2016, 7 pages.

\* cited by examiner

| index | HARQ-ACK(j) in a first sPUCCH of a subframe n ||||||||
|---|---|---|---|---|---|---|---|
| | HARQ-ACK(0) | HARQ-ACK(1) | HARQ-ACK(2) | HARQ-ACK(3) | HARQ-ACK(4) | HARQ-ACK(5) | HARQ-ACK(6) |
| 0 | The first sPDSCH in a subframe n-k | The second sPDSCH in a subframe n-k | The third sPDSCH in a subframe n-k | The fourth sPDSCH in a subframe n-k | The fifth sPDSCH in a subframe n-k | The sixth sPDSCH in a subframe n-k | The seventh sPDSCH in a subframe n-k |
| 1 | The fourth sPDSCH in a subframe n-k | The fifth sPDSCH in a subframe n-k | The sixth sPDSCH in a subframe n-k | The seventh sPDSCH in a subframe n-k | The first sPDSCH in a subframe n-k+1 | The second sPDSCH in a subframe n-k+1 | The third sPDSCH in a subframe n-k+1 |
| 2 | The fifth sPDSCH in a subframe n-k | The sixth sPDSCH in a subframe n-k | The seventh sPDSCH in a subframe n-k | The first sPDSCH in a subframe n-k+1 | The second sPDSCH in a subframe n-k+1 | The third sPDSCH in a subframe n-k+1 | The fourth sPDSCH in a subframe n-k+1 |
| 3 | NA (e.g. sPDCCH or PDCCH region) | The first sPDSCH in a subframe n-k | The second sPDSCH in a subframe n-k | The third sPDSCH in a subframe n-k | The fourth sPDSCH in a subframe n-k | The fifth sPDSCH in a subframe n-k | The sixth sPDSCH in a subframe n-k |
| 4 | The third sPDSCH in a subframe n-k | The fourth sPDSCH in a subframe n-k | The fifth sPDSCH in a subframe n-k | The sixth sPDSCH in a subframe n-k | NA (e.g. sPDCCH or PDCCH region) | The first sPDSCH in a subframe n-k+1 | The second sPDSCH in a subframe n-k+1 |

FIG. 4

$$\text{start symbol index of } sPDSCH = n_f \times 10 \times 14 + \lfloor n_s/2 \rfloor \times 14 + l$$

start symbol index of sPUCCH or sPUSCH ≥ start symbol index of sPDSCH + k $n_f$ : Radio Frame Number (System Frame Number)

$n_s$ : Slot Number $l$ : Symbol Number $k$ : UE processing time (Latency)

FIG. 7

TERMINAL APPARATUS AND METHOD

TECHNICAL FIELD

Embodiments of the present invention relate to a technique of a terminal apparatus and a method that enable efficient communication.

This application claims priority based on JP 2016-096128 filed on May 12, 2016, the contents of which are incorporated herein by reference.

BACKGROUND ART

The 3rd General Partnership Project (3GPP), which is a standardization project, has standardized the Evolved Universal Terrestrial Radio Access (EUTRA), in which high-speed communication is realized by adopting an Orthogonal Frequency Division Multiplexing (OFDM) communication scheme and flexible scheduling in a unit of predefined frequency and time called a resource block. It should be noted that the overall communications that have employed the standardized EUTRA technology may be referred to as Long Term Evolution (LTE) communications.

Moreover, the 3GPP discusses the Advanced EUTRA (A-EUTRA), which realizes higher-speed data transmission and has upper compatibility with the EUTRA. The EUTRA relates to a communication system based on a network in which base station apparatuses have substantially an identical cell configuration (cell size); however, regarding the A-EUTRA, discussion is made on communication system based on a network (heterogeneous wireless network, heterogeneous network) in which base station apparatuses (cells) having different configurations coexist in the same area.

In addition, discussion is made on a technique to reduce the time for communication-related processing (Non Patent Literature 1).

CITATION LIST

Non Patent Literature

Non Patent Literature 1: "3GPP TR 36.881 v. 0.5.0 (2015 November)", R2-157181, 4 Dec. 2015.

SUMMARY OF INVENTION

Technical Problem

Some of the communication devices (terminal apparatuses and/or base station apparatuses) may be unable to perform efficient communications by means of conventional transmit power control or conventional transmit control.

An aspect of the present invention has been made in view of the above described respects, and an object of the present invention is to provide a terminal apparatus, and a method that enable transmit power control or transmit control for efficient communications.

Solution to Problem (1) In order to accomplish the object described above, an aspect of the present invention is contrived to provide the following means. A terminal apparatus according to an aspect of the present invention is a terminal apparatus for communicating with a base station apparatus, the terminal apparatus including: a receiver configured to receive a Physical Downlink Shared Channel (PDSCH); and a transmitter configured to transmit a Hybrid Auto Repeat request-acknowledgement (HARQ-ACK) for the PDSCH by use of a Physical Uplink Control Channel (PUCCH), wherein the transmitter shortens a timing for transmitting the HARQ-ACK for the PDSCH based on a Transmission Time Interval (TTI) length, having a prescribed value, that is configured for the PDSCH, and a PUCCH format to transmit the HARQ-ACK is determined based on the TTI length of the PDSCH and the TTI length of the PUCCH.

(2) In addition, a method according to an aspect of the present invention is a method employed by a terminal apparatus for communicating with a base station apparatus, the method including the steps of: receiving a Physical Downlink Shared Channel (PDSCH); transmitting a Hybrid Auto Repeat request-acknowledgement (HARQ-ACK) for the PDSCH by use of a Physical Uplink Control Channel (PUCCH); shortening a timing for transmitting the HARQ-ACK for the PDSCH based on a Transmission Time Interval (TTI) length, having a prescribed value, that is configured for the PDSCH; and determining a PUCCH format to transmit the HARQ-ACK based on the TTI length of the PDSCH and the TTI length of the PUCCH.

Advantageous Effects of Invention

An aspect of the present invention can provide improved transmission efficiency in a radio communication system in which a base station apparatus and a terminal apparatus communicate.

BRIEF DESCRIPTION OF DRAWINGS

FIG. 4 illustrates the mapping of sPDSCHs in a certain subframe of a certain serving cell to the HARQ-ACK (j) for a PUCCH format 2b in a case that one or more sPDSCHs are detectable for a single subframe according to a first embodiment.

FIG. 7 is a chart describing a transmission timing of the HARQ-ACK relative to the sPDSCH according to the first embodiment.

DESCRIPTION OF EMBODIMENTS

First Embodiment

Figure 1:
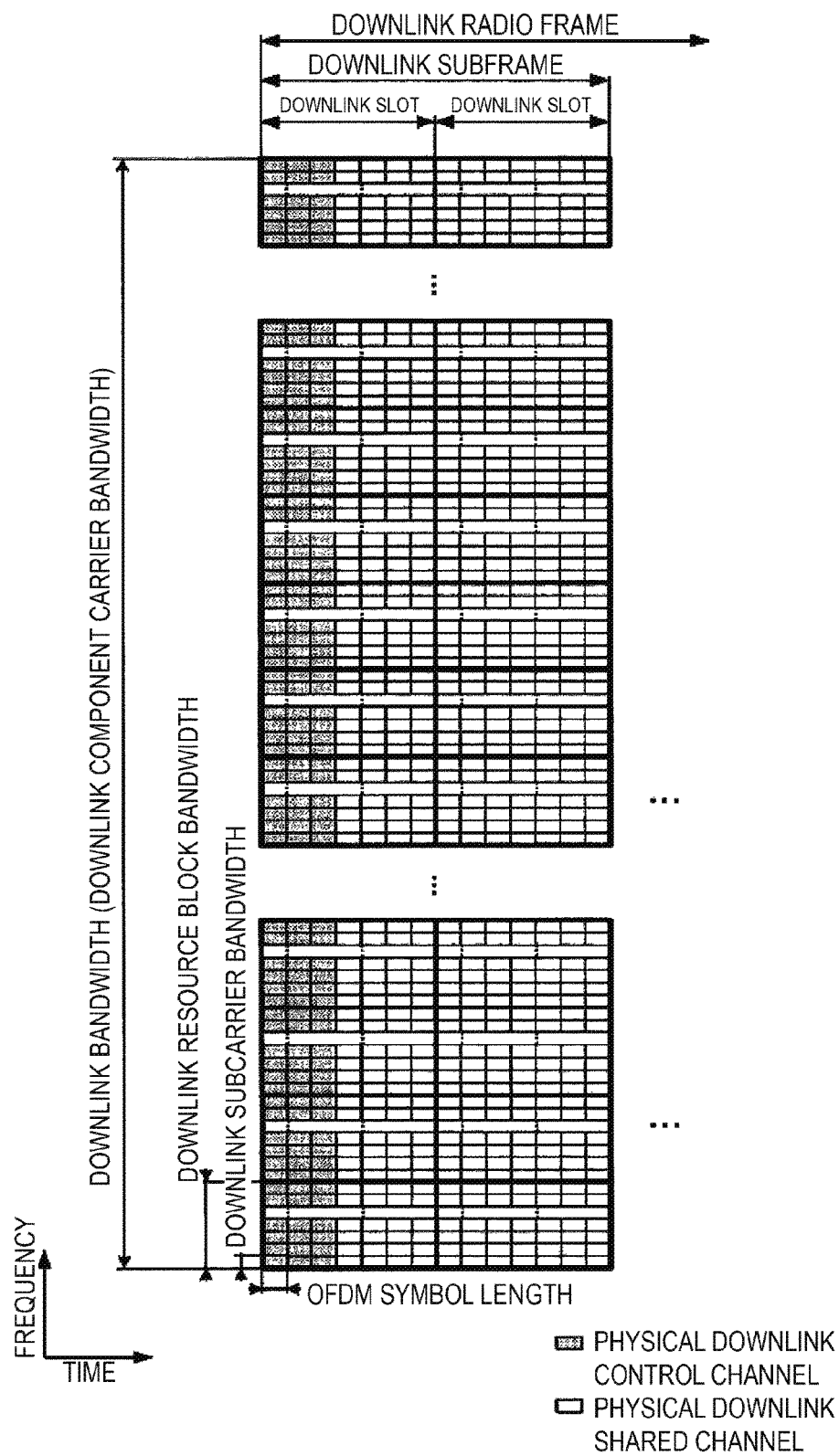
FIG. 1 is a diagram illustrating an example of a downlink radio frame configuration according to a first embodiment.

A first embodiment of the present invention will be described below. A description will be provided by using a communication system in which a base station apparatus (base station, NodeB, or EUTRAN NodeB (eNB, evolved NodeB)) and a terminal apparatus (terminal, mobile station, user device, or User equipment (UE)) communicate in a cell.

Main physical channels, physical signals, and frame structures that are used in the present embodiment will be described. The "channel" refers to a medium used to transmit a signal, and the "physical channel" refers to a physical medium used to transmit a signal. In the present embodiment, the term physical channel may be used synonymously with the term "physical signal." In future forms of LTE, another physical channel may be added, the constitution/configuration or format of the existing physical channel may be changed, or another constitution/configuration or format may be added; however, the description of each embodiment of the present invention will not be affected even if such additions or changes are performed.

A frame structure type according to the present embodiment will be described.

A frame structure type 1 (FS1) is applied to the frequency division duplex (FDD). This means that the FS1 is applied to a cell operation where the FDD is supported. The FS1 can be applied to both the Full Duplex-FDD (FD-FDD) and the Half Duplex-FDD (HD-FDD).

In the FDD, the different frequency domains are assigned to the downlink transmission and the uplink transmission. To put it differently, operating bands are defined individually for the downlink transmission and the uplink transmission. Hence, different carrier frequencies are applied to the downlink transmission and the uplink transmission. Accordingly, in the FDD, the downlink transmission can use 10 subframes, and the uplink transmission can use different 10 subframes. In an HD-FDD operation, the terminal apparatus cannot perform transmission and reception at the same time, but in an FD-FDD operation, the terminal apparatus can perform transmission and reception at the same time.

In an HD-FDD operation, the terminal apparatus cannot perform transmission and reception at the same time, but in an FD-FDD operation, the terminal apparatus can perform transmission and reception at the same time.

In addition, HD-FDD has two types: for a type A HD-FDD operation, a guard period is created by a terminal apparatus by not receiving the last part (last symbol) of a downlink subframe immediately before an uplink subframe from the same terminal apparatus; and for a type B HD-FDD operation, guard periods, each referred to as an HD guard subframe, are created by a terminal apparatus by not receiving a downlink subframe immediately before an uplink subframe from the same terminal apparatus, and by not receiving a downlink subframe immediately after an uplink subframe from the same terminal apparatus. To put it differently, in the HD-FDD operation, a guard period is created by the terminal apparatus controlling a reception process of the downlink subframe. It should be noted that the symbol may contain either an OFDM symbol or an SC-FDMA symbol.

A frame structure type 2 (FS2) is applied to the Time Division Duplex (TDD). This means that the FS2 is applied to a cell operation where the TDD is supported. Each radio frame is constituted of two half-frames. Each half-frame is constituted of five subframes. The UL-DL configuration in a given cell may vary among radio frames. The subframe in uplink or downlink transmission may be controlled in the latest radio frame. The terminal apparatus can acquire the UL-DL configuration in the latest radio frame via a PDCCH or higher layer signaling. Note that the UL-DL configuration indicates a constitution of an uplink subframe, a downlink subframe, and a special subframe, in TDD. The special subframe is constituted of a Downlink Pilot Time Slot (DwPTS) enabling downlink transmission, a Guard Period (GP), and an Uplink Pilot Time Slot (UpPTS) enabling uplink transmission. The configurations of a DwPTS and a UpPTS in a special subframe are managed in a table, so that the terminal apparatus can acquire the constitutions via higher layer signaling. Note that the special subframe serves as a switch point from downlink to uplink. Hence, at a switch point, the terminal apparatus transitions from reception to transmission and the base station apparatus transitions from transmission to reception. Switch points occur periodically either in a 5-ms cycle or in a 10-ms cycle. In a case that the switch points occur in a 5-ms cycle, the special subframes exist in both half-frames. In a case that the switch points occur in a 10-ms cycle, the special subframe exist only in a first half-frame.

In a case that two symbols are assigned to an UpPTS, a sounding reference signal (SRS) and a PRACH preamble format 4 can be allocated.

In addition, in a case of the TDD, a TDD enhanced Interference Management and Traffic Adaptation (eIMTA) technology is applicable. This technology takes the communication volume (traffic volume) of each cell into consideration. The eITMA is a technique for optimal communication to be achieved by changing the proportions of downlink subframes and uplink subframes within each radio frame (i.e., 10 subframes) by switching TDD configurations dynamically (using L1 level or L1 signalling) based upon the communication volume of the downlink and/or that of the uplink as well as on the interference quantities.

The FS1 and the FS2 allow for the application of an NCP (normal cyclic prefix) and an ECP (extended cyclic prefix).

A frame structure type 3 (FS3) is applied to a Licensed Assisted Access (LAA) secondary cell operation. Alternatively, the FS3 may allow only for the NCP. The 10 subframes contained in each radio frame are used for downlink transmission. The terminal apparatus processes each subframe as an empty subframe assuming that no signal is present in the subframe unless defined otherwise or unless downlink transmission is detected in the subframe concerned. The downlink transmission occupies a single subframe or multiple consecutive subframes. The consecutive subframes include a first subframe and a last subframe. The first subframe begins with any of the symbols or slots (e.g., OFDM symbol #0 or #7) of the subframe. In addition, the last subframes to be occupied are a full subframe (i.e., 14 OFDM symbols) or are as many as the OFDM symbols indicated based on one of the DwPTS periods. Whether a particular one of the consecutive subframes is the last subframe or not is indicated to the terminal apparatus by means of a certain field contained in a DCI format. In that field, the number of OFDM symbols used for the subframe where the field is detected and the next subframe may be indicated. In FS3, the base station apparatus performs channel access procedures associated with LBT before performing the downlink transmission.

It should be noted that the FS3 supports only the downlink transmission, but it may also support the uplink transmission. In the latter case, the FS3 that supports only the downlink transmission may be referred to as the FS3-1 or FS3-A, whereas the FS3 that supports both the downlink transmission and the uplink transmission may be referred to as the FS3-2 or FS3-B.

The terminal apparatus and the base station apparatus that support the FS3 may communicate using any frequency band that requires no license.

The operating bands that correspond to the LAA cells or the FS3 cells may be managed together with the table of the EUTRA operating bands. For instance, the indexes of the EUTRA operating bands may be managed with numbers 1 to 44 and the indexes of the operating bands corresponding to LAA (or LAA frequency) may be managed with number 46. For instance, Index 46 may define only the frequency band of the downlink. Some of the indexes may be reserved for the frequency band of the uplink or may be secured in advance for future definition. The corresponding duplex mode may be different from FDD or TDD, or may be FDD or TDD. The frequency that allows for LAA operations may preferably be 5 GHz or higher, but it may be equal to or lower than 5 GHz. Hence, communications of the LAA operation may be performed at a frequency associated with the operating band corresponding to the LAA.

Next, a downlink radio frame configuration and an uplink radio frame configuration according to the present embodiment will be described.

FIG. 1 is a diagram illustrating an example of a downlink radio frame configuration according to the present embodiment. In the downlink, an OFDM access scheme is used.

The following downlink physical channels are used for downlink radio communication from the base station apparatus to the terminal apparatus. Here, the downlink physical channels are used to transmit the information output from the higher layers.

Physical Broadcast Channel (PBCH)
Physical Control Format Indicator Channel (PCFICH)
Physical Hybrid Automatic repeat request Indicator Channel (PHICH)
Physical Downlink Control Channel (PDCCH)
Enhanced Physical Downlink Control Channel (EPDCCH)
Short/shorter/shortened Physical Downlink Control Channel (sPDCCH, PDCCH for sTTI)
Physical Downlink Shared Channel (PDSCH)
Short/Shorter/Shortened Physical Downlink Shared Channel (sPDSCH, PDSCH for sTTI)
Physical multicast channel (PMCH)

The following downlink physical signals are used in the downlink radio communication. Here, the downlink physical signals are not used to transmit the information output from the higher layers but is used by the physical layer.

Synchronization signal (SS)
Downlink reference signal (DLRS)
Discovery Signal (DS)

According to the present embodiment, the following five types of downlink reference signals are used.

Cell-specific reference signal (CRS)
UE-specific reference signal (URS) relating to the PDSCH
Demodulation reference signal (DMRS) relating to the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

A downlink radio frame includes downlink resource block (RB) pairs. The downlink RB pairs are each a unit for allocation of downlink radio resources and the like, and is constituted of a frequency band of a predefined width (RB bandwidth) and a time duration (two slots equal to one subframe). Each of the downlink RB pairs is constituted of two downlink RBs (RB bandwidth×slot) that are contiguous in time domain. Each of the downlink RBs is constituted of 12 subcarriers in frequency domain. In the time domain, the downlink RB is constituted of seven OFDM symbols in a case that an NCP is added, while the downlink RB is constituted of six OFDM symbols in a case that an ECP that has a longer CP length than the NCP is added. A region defined by a single subcarrier in the frequency domain and a single OFDM symbol in the time domain is referred to as a resource element (RE). The PDCCH/EPDCCH is a physical channel on which Downlink Control Information (DCI) such as a terminal apparatus identity, PDSCH scheduling information, PUSCH (physical uplink shared channel) scheduling information, a modulation scheme, a coding rate, and a retransmission parameter is transmitted. Note that although a downlink subframe in a single component carrier (CC) is described here, a downlink subframe is defined for each CC and downlink subframes are substantially synchronized between the CCs. The above-mentioned state where downlink subframes are substantially synchronized between the CCs refers to a state where in a case that transmission is performed by use of multiple CCs from the base station apparatus, the transmission timing errors of all the CCs are within a prescribed range.

An SS, a PBCH, and a DLRS may be allocated in the downlink subframes, although not illustrated here. Examples of the DLRS include a CRS, a CSI-RS, a user equipment-specific reference signal (UERS), and a DMRS. The CRS is transmitted through the same antenna port (transmit port) as that for PDCCH, the CSI-RS is used to measure channel state information (CSI), the UERS is transmitted through the same antenna port as that for some PDSCHs, and the DMRS is transmitted through the same transmit port as that for EPDCCH. Moreover, carriers on which no CRS is mapped may be used. In this case, a similar signal (referred to as an enhanced synchronization signal) to a signal corresponding to some antenna ports (e.g., only antenna port 0) or all the antenna ports for the CRS can be inserted into some subframes (e.g., the first and sixth subframes in the radio frame) as time and/or frequency tracking signals. Here, an antenna port may be referred to as a transmit port. Here, the term "physical channel/physical signal is transmitted through an antenna port" also means that a physical channel/physical signal is transmitted via a radio resource or layer corresponding to the antenna port. For example, the receiver is intended to receive a physical channel or physical signal via a radio resource or layer corresponding to the antenna port.

Figure 2:
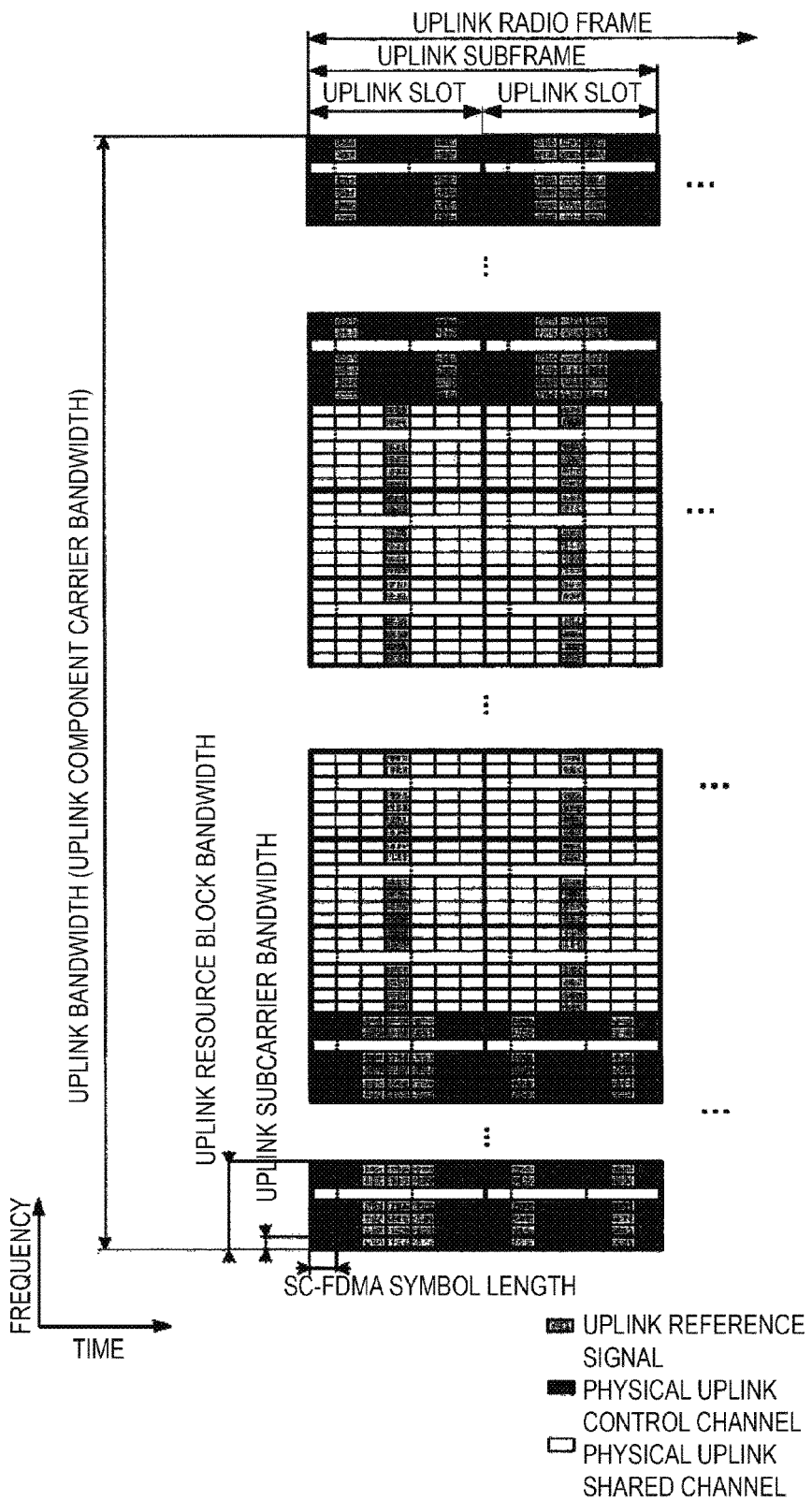
FIG. 2 is a diagram illustrating an example of an uplink radio frame configuration according to the first embodiment.

FIG. 2 is a diagram illustrating an example of an uplink radio frame configuration according to the present embodiment. An SC-FDMA scheme is used in the uplink.

In uplink radio communication from the terminal apparatus to the base station apparatus, the following uplink physical channels are used. Here, the uplink physical channels are used to transmit information output from the higher layers.

Physical uplink control channel (PUCCH)
Short/Shorter/Shortened Physical Uplink Control Channel (sPUCCH, PUCCH for short TTI)
Physical Uplink Shared Channel (PUSCH)
Short/shorter/shortened Physical Uplink Shared Channel (sPUSCH, PUSCH for short TTI)
Physical Random Access Channel (PRACH)
Short/shorter/shortened Physical Random Access Channel (sPRACH, PRACH for short TTI)

The following uplink physical signal is used for uplink radio communication. Here, the uplink physical signal is not used to transmit information output from the higher layers but is used by the physical layer.

Uplink Reference Signal (ULRS)

According to the present embodiment, the following two types of uplink reference signals are used.

Demodulation Reference Signal (DMRS)

Sounding Reference Signal (SRS)

In the uplink, a Physical Uplink Shared Channel (PUSCH), a Physical Uplink Control Channel (PUCCH), and the like are assigned. A ULRS (Uplink Reference Signal) is also assigned together with the PUSCH and the PUCCH. An uplink radio frame is constituted of uplink RB pairs. The uplink RB pairs are each a unit for allocation of uplink radio resources and the like, and is constituted of the frequency domain of a predefined width (RB bandwidth) and the time domain (two slots equal to one subframe). Each of the uplink RB pairs is constituted of two uplink RBs (RB bandwidth×slot) that are contiguous in the time domain. Each of the uplink RB is constituted of 12 subcarriers in the frequency domain. In the time domain, the uplink RB is constituted of seven SC-FDMA symbols in a case that an NCP is added, while the uplink RB is constituted of six SC-FDMA symbols in a case that an ECP is added. Note that although an uplink subframe in a single CC is described here, an uplink subframe may be defined for each CC.

FIG. 1 and FIG. 2 illustrate examples where different physical channels/physical signals are frequency-division multiplexed (FDM) and/or time-division multiplexed (TDM).

It should be noted that in a case that various physical channels and/or physical signals are transmitted to sTTIs (short/shorter/shortened Transmission Time Intervals), each of such physical channels and/or physical signals may be referred to as an sPDSCH, sPDCCH, sPUSCH, sPUCCH, or sPRACH.

In a case that a physical channel is transmitted to an sTTI, the number of OFDM symbols and/or SC-FDMA symbols that the physical channel is constituted of may be equal to or smaller than 14 for an NCP (12 for an ECP). In addition, the number of symbols used in the physical channel for sTTI may be set by use of DCI and/or DCI format, or may be set by use of higher layer signalling. Not only the number of symbols used for sTTI but also the start symbol in the time direction may be set.

In addition, the sTTI may be transmitted within a particular bandwidth that is within the system bandwidth. The bandwidth to be set for sTTI may be set by use of DCI and/or DCI format, or may be set by use of higher layer signalling (RRC signalling, MAC CE). The bandwidth may be set by use of the resource block indexes of the start and the end, or by use of the frequency positions thereof. Alternatively, it may be set by use of the bandwidth and the resource block index/frequency position of the start. The bandwidth for the sTTI mapping may be referred to as the sTTI band. The physical channel mapped in the sTTI band may be referred to as the physical channel for sTTI. The physical channel for sTTI may include an sPDSCH, sPDCCH, sPUSCH, sPUCCH, or sPRACH.

In a case that information/parameters to be used for defining the sTTI are set by use of the DCI and/or DCI formats, the DCI and/or DCI formats may be scrambled by use of a particular RNTI or a CRC scrambled by a particular RNTI may be added to a bit string that constitutes the DCI format.

Here, the downlink physical channel and the downlink physical signal are also collectively referred to as a downlink signal. The uplink physical channel and the uplink physical signal are also collectively referred to as an uplink signal. The downlink physical channels and the uplink physical channels are also collectively referred to as a physical channel. The downlink physical signals and the uplink physical signals are also collectively referred to as physical signals.

PBCH is used for broadcasting a master information block (MIB, a Broadcast Channel (BCH)) that is shared by the terminal apparatuses.

The PCFICH is used for transmission of information indicating a region (OFDM symbols) to be used for transmission of the PDCCH.

The PHICH is used for transmission of an HARQ indicator (HARQ feedback or response information) indicating an ACKnowledgement (ACK) or a Negative ACKnowledgement (NACK) for the uplink data (Uplink Shared Channel (UL-SCH)) received by the base station apparatus.

The PDCCH, the EPDCCH, and/or the sPDCCH is used for transmitting downlink control information (DCI). In the present embodiment, the PDCCH may include an EPDCCH. In addition, the PDCCH may include an sPDCCH.

Here, multiple DCI formats may be defined for the DCI transmitted through the PDCCH, EPDCCH, and/or sPDCCH. In other words, a field for the DCI may be defined in a DCI format and may be mapped to information bits.

In a case that a physical channel for sTTI can be transmitted in a serving cell, that is, in a terminal apparatus and a base station apparatus in a serving cell, the terminal apparatus may monitor PDCCH/EPDCCH where the DCI format including information/parameter to set the sTTI is mapped. Hence, the base station apparatus may map a DCI format containing information/parameter to set sTTI in the PDCCH/EPDCCH and transmit such DCI format to a terminal apparatus supporting the transmission and/or reception of a physical channel by use of the sTTI.

Here, the DCI format for the downlink is also referred to as the downlink DCI, the downlink grant (DL grant), and/or the downlink scheduling grant, and/or the downlink assignment. Here, the DCI format for the uplink is also referred to as the uplink DCI, the uplink grant (UL grant), and/or the uplink scheduling grant, and/or the uplink assignment.

For example, DCI formats (e.g., DCI format 1, DCI format 1A, and/or DCI format 1C) to be used for the scheduling of one PDSCH in one cell may be defined as downlink assignments.

Furthermore, for example, DCI formats (e.g., DCI format 0, and/or DCI format 4, or a first UL grant) to be used for the scheduling of one PUSCH in one cell may be defined as uplink grants.

For instance, the UL grant may contain a Carrier Indicator Field (CIF). In addition, the UL grant may contain information on the transmit power control command (TPC command) for the PUSCH to be scheduled. In addition, the UL grant may contain information on a cyclic shift for DMRS (DMRS associated with the transmission of the PUSCH). In addition, the UL grant may contain information on the modulation and coding scheme (MCS) and/or information on the redundancy version. In addition, the UL grant may contain information on the Resource block assignment and/or information on the hopping resource assignment. In addition, the UL grant may contain information to be used for requesting the transmission of CSI (CSI request). In addition, the UL grant may contain information to be used for requesting the transmission of SRS (SRS request).

Here, the UL grant may be defined as a common DCI shared by multiple terminal apparatuses and/or a DCI dedicated exclusively to a single terminal apparatus. Hence, the UL grant may be transmitted in a common search space and/or in a user-equipment-specific search space. In addition, the UL grant may be transmitted through the PDCCH and/or the EPDCCH. CRC parity bits to be added to the UL grant may be scrambled with an RNTI (to be described later).

In addition, the UL grant may be used for defining the configuration for a single subframe. Hence, the UL grant may be used for indicating the configuration commonly used in a single subframe. Hence, the configuration indicated by use of the UL grant may be valid for a single subframe. To put it differently, the UL grant may be a subframe-specific UL grant. Hence, in a case that the PUSCH is scheduled by use of the UL grant, the terminal apparatus may perform transmission through the scheduled PUSCH in a subframe (by use of all the subframes).

In addition, DCI format containing, at least, information associated with the frequency resource assignment to PUSCH, sPUSCH, and/or sPDCCH (e.g., information associated with the physical resource block assignment to PUSCH, sPUSCH, and/or sPDCCH) may be defined as the uplink grant (hereinafter such an uplink grant is also referred to as a second UL grant, and such UL DCI as second UL DCI). Hence, the second UL grant may be used at least for scheduling the PUSCH, sPUSCH, and/or sPDCCH.

For instance, the second UL grant may contain information associated with the bandwidth for the PUSCH to be scheduled, sPUSCH to be scheduled, and/or sPDCCH to be scheduled. To put it differently, the second UL grant may contain information associated with the bandwidth to be scheduled for the transmission through the PUSCH, the transmission through the sPUSCH, and/or the transmission through the sPDCCH.

For instance, the second UL grant may contain information associated with the start position (and/or the end position, for instance, the length from the start position) of the physical resource block for the PUSCH to be scheduled, sPUSCH to be scheduled, and/or sPDCCH to be scheduled. In addition, the second UL grant may contain information indicating the physical resource block for the PUSCH to be scheduled, sPUSCH to be scheduled, and/or sPDCCH to be scheduled.

Here, the second UL grant may contain a carrier indicator field (CIF). In addition, the second UL grant may contain information on the transmit power control command (TPC command) for the PUSCH to be scheduled. In addition, the second UL grant may contain information on the transmission power command for the sPUSCH to be scheduled. In addition, the second UL grant may contain information on the cyclic shift for the DMRS (DMRS associated with the transmission of the PUSCH and/or sPUSCH). In addition, the second UL grant may contain information on the MCS and/or information on the redundancy version. In addition, the second UL grant may contain information on the resource block assignment and/or information on the hopping resource assignment. In addition, the second UL grant may contain information to be used for requesting the transmission of CSI (CSI request). In addition, the second UL grant may contain information to be used for requesting the transmission of SRS (SRS request).

Here, the information (a part or the entirety of the information) to be sent by use of the second UL grant may be transmitted by use of a higher-layer signal (e.g., a signal in an MAC layer and/or a signal in an RRC layer). In the following description, the downlink control information like the one described above is transmitted by use of the second UL grant. It is, however, allowable that the downlink control information to be transmitted by use of the second UL grant may be transmitted by use of a higher-layer signal.

Here, the second UL grant may be defined as a common DCI shared by multiple terminal apparatuses (UL grant, Common UL grant, Non-UE specific UL grant). Hence, the second UL grant may be transmitted only in the common search space (to be described later). In addition, the second UL grant may be transmitted only through the PDCCH and/or the EPDCCH.

CRC parity bits to be added to the second UL grant may be scrambled with an RNTI (to be described later). Here, the CRC parity bits to be added to the second UL grant may be scrambled with a first UL-RNTI. In addition, the search space where the second UL grant is transmitted (e.g., common search space) may be provided by at least the first UL-RNTI.

In addition, the second UL grant may be used for defining the configuration for a single subframe. Hence, the second UL grant may be used for indicating the configuration commonly used in a single subframe. Hence, the configuration indicated by use of the second UL grant may be valid for a single subframe or for multiple subframes. To put it differently, the second UL grant may be a sub-frame specific UL grant. Hence, in a case that the PUSCH is scheduled by use of the second UL grant, the terminal apparatus may perform transmission through the scheduled PUSCH in a subframe (or by use of all the subframes).

In addition, DCI format containing, at least, information on the time resource assignment to the PUSCH and/or the sPUSCH may be defined as the uplink grant (hereinafter such an uplink grant is also referred to as a third UL grant, and such UL DCI as third UL DCI). For instance, the third UL grant may contain information associated with the assignment of Transmission Time Intervals (TTIs) for transmissions through the PUSCH and/or the sPUSCH. Hence, the third UL grant may be used at least for scheduling the PUSCH and/or sPUSCH.

For instance, the third UL grant may contain information associated with TTI length for the PUSCH to be scheduled and/or the sPUSCH to be scheduled. In addition, the third UL grant may contain information associated with the position of the DMRS to be transmitted together with the PUSCH to be scheduled. In addition, the third UL grant may contain information associated with the position of the DMRS to be transmitted together with the sPUSCH to be scheduled.

In addition, the third UL grant may contain information associated with the DMRS to be transmitted together with the PUSCH to be scheduled (e.g., information on the cyclic shift of the DMRS). In addition, the third UL grant may contain information associated with the DMRS to be transmitted together with the sPUSCH to be scheduled (e.g., information on the cyclic shift of the DMRS). In addition, the third UL grant may contain information on the delay for the transmission through the PUSCH and/or the transmission through the sPUSCH based on the reception (detection) of the third UL grant (Grant to Tx delay offset).

Here, the third UL grant may contain a carrier indicator field (CIF). In addition, the third UL grant may contain information on the transmit power command (TPC command) for the PUSCH to be scheduled. In addition, the third UL grant may contain information on the transmission power command for the sPUSCH to be scheduled. In addition, the third UL grant may contain information on the cyclic shift for the DMRS (DMRS associated with the transmission of the PUSCH and/or sPUSCH). In addition, the third UL grant may contain information on the MCS and/or information on the redundancy version. In addition, the third UL grant may contain information on the Resource block assignment and/or information on the hopping resource assignment. In addition, the third UL grant may contain information to be used for requesting the transmission of CSI (CSI request). In addition, the third UL grant may contain information to be used for requesting the transmission of SRS (SRS request). In addition, the third UL grant may contain information on a TTI index (to be described later).

Here, the third UL grant may be defined as the DCI dedicated exclusively to a single terminal apparatus (UL grant, UE-specific UL grant). Hence, the third UL grant may be transmitted only in a UE-specific space (to be described later). In addition, the third UL grant may be transmitted through the PDCCH, the EPDCCH, and/or the sPDCCH. In addition, the third UL grant may be transmitted through the PDSCH.

CRC parity bits to be added to the third UL grant may be scrambled with an RNTI (to be described later). Here, the CRC parity bits to be added to the third UL grant may be scrambled with a third UL-RNTI. In addition, the search space where the third UL grant is transmitted (e.g., user-equipment-specific search space) may be provided by at least the second UL-RNTI.

In addition, the third UL grant may be used for defining the configuration for a single TTI. Hence, the third UL grant may be used for indicating the configuration used in a single TTI. Hence, the configuration indicated by use of the third UL grant may be valid for a single TTI. To put it differently, the second UL grant may be a TTI specific UL grant. Hence, in a case that the PUSCH is scheduled by use of the third UL grant, the terminal apparatus may perform transmission through the scheduled PUSCH in a TTI (in a TTI in a subframe).

Here, as described earlier, the second UL grant may be used for scheduling the sPDCCH through which the third UL grant is to be transmitted. For instance, the terminal apparatus may receive (detect) the third UL grant by receiving (detecting) the second UL grant. In addition, by monitoring (decoding, detecting) the PDCCH and/or EPDCCH through which the second UL grant is to be transmitted, the terminal apparatus may monitor (decode, detect) the PDCCH, the EPDCCH, and/or the sPDCCH through which the third UL grant is to be transmitted.

Here, the PDCCH and/or the EPDCCH through which the second UL grant is to be transmitted may be detected by monitoring by the terminal apparatus 1, and the resource of the PDCCH, EPDCCH, and/or sPDCCH through which the third UL grant is to be transmitted may be directly indicated by the information contained in the second UL grant. Here, the resource of the PDCCH, the EPDCCH, and/or the sPDCCH may include the time resource and/or the frequency resource. Hence, the PDCCH, the EPDCCH, and/or the sPDCCH, through which the third UL grant is to be transmitted need not be monitored by the terminal apparatus.

Hereinafter, the uplink grant (DCI format) may include the first UL grant, the second UL grant, and/or the third UL grant.

Here, in a case that a PDSCH resource is scheduled by use of the downlink assignment, the terminal apparatus may receive downlink data (DL-SCH) through the PDSCH based on the scheduling. In a case that a PUSCH resource is scheduled by use of the uplink grant, the terminal apparatus may transmit uplink data (UL-SCH) and/or uplink control information (UCI) through the PUSCH based on the scheduling. In a case that an sPUSCH resource is scheduled by use of the uplink grant, the terminal apparatus may transmit uplink data and/or uplink control information through the sPUSCH based on the scheduling.

The sPDSCH may be scheduled based on the first DL grant detected through the PDCCH and/or EPDCCH and on the second DL grant detected through the sPDCCH. Both the first DL grant and the second DL grant may be scrambled by use of a particular RNTI.

Based on the DCI contained in the first DL grant detected through the PDCCH and/or EPDCCH, the domain to be monitored for the sPDCCH (hence, the sTTI band for downlink) may be set.

The resource for the sPUCCH may be determined based on the DCI contained in the second DL grant detected through the sPDCCH.

Here, the terminal apparatus may monitor a set of possible PDCCHs, possible EPDCCHs, and/or possible sPDCCHs. The PDCCH may include an EPDDCH and/or an sPDCCH.

Here, the above-mentioned possible PDCCHs are options that may be indicated by the base station apparatus as the target that the PDCCH can be allocated on and/or transmitted to. Furthermore, the term "monitor" may imply that the terminal apparatus attempts to decode each PDCCH in the set of the possible PDCCHs in accordance with each of all the monitored DCI formats.

Here, the set of possible PDCCHs to be monitored by the terminal apparatus is also referred to as a search space. The search space may include a common search space (CSS). For example, the CSS may be defined as a space common to multiple terminal apparatuses.

The search space may include a UE-specific search space (USS). For example, the USS may be provided at least based on a dell-radio network temporary identifier (C-RNTI) assigned to the terminal apparatus. The terminal apparatus may monitor the PDCCHs in the CSS and/or USS to detect a PDCCH destined for the terminal apparatus itself.

In addition, an RNTI assigned to the terminal apparatus by the base station apparatus may be used for the transmission of the DCI (transmission through the PDCCH). Specifically, cyclic redundancy check (CRC) parity bits may be attached to the DCI format (or possibly to the downlink control information), and after the attaching, the CRC parity bits may be scrambled with the RNTI. Here, the CRC parity bits to be attached to the DCI format may be obtained from a payload of the DCI format.

Here, in the present embodiment, the terms "CRC parity bit," "CRC bit," and "CRC" may have the same meaning. In addition, such phrases as "the PDCCH through which the DCI format with an attached CRC parity bit is transmitted," "the PDCCH containing a CRC parity bit and also containing a DCI format," "the PDCCH containing a CRC parity bit," and "the PDCCH containing a DCI format" may have the same meaning. In addition, such phrases as "PDCCH including X" and "PDCCH with X" may have the same meaning. The terminal apparatus may monitor DCI formats. In addition, the terminal apparatus may monitor DCIs. In addition, the terminal apparatus may monitor PDCCHs.

The terminal apparatus attempts to decode the DCI format to which the CRC parity bits scrambled with the RNTI are attached, and detects, as a DCI format destined for the terminal apparatus itself, the DCI format for which the CRC has been successful (also referred to as blind decoding). In other words, the terminal apparatus may detect the PDCCH with the CRC scrambled with the RNTI. The terminal apparatus may detect the PDCCH with the DCI format to which the CRC parity bits scrambled with the RNTI are attached.

Here, the RNTI may include a C-RNTI (Cell-Radio Network Temporary Identifier). For instance, the C-RNTI may be an identifier unique to the terminal apparatus and used for the identification in RRC connection and scheduling. In addition, the C-RNTI may be used for dynamically scheduled unicast transmission.

The RNTI may further include a Semi-Persistent Scheduling C-RNTI (SPS C-RNTI). For instance, the SPS C-RNTI is an identifier unique to the terminal apparatus and used for semi-persistent scheduling. In addition, the SPS C-RNTI may be used for semi-persistently scheduled unicast transmission. Here, the semi-persistently scheduled transmission may also mean periodically scheduled transmission.

In addition, the RNTI may include a Random Access RNTI (RA-RNTI). For instance, the RA-RNTI is an identifier used for transmission of a random access response message. In other words, the RA-RNTI may be used for the transmission of the random access response message in a random access procedure. For example, the terminal apparatus may monitor the PDCCH with the CRC scrambled with the RA-RNTI after the transmission of a random access preamble. In addition, the terminal apparatus may receive a random access response through the PDSCH in accordance with detection of the PDCCH with the CRC scrambled with the RA-RNTI.

Here, the PDCCH with the CRC scrambled with the C-RNTI may be transmitted in the USS or CSS. In addition, the PDCCH with the CRC scrambled with the SPS C-RNTI may be transmitted in the USS or CSS. In addition, the PDCCH with the CRC scrambled with the RA-RNTI may be transmitted only in the CSS.

Examples of the RNTI used to scramble CRC include RA-RNTI, C-RNTI, SPS C-RNTI, temporary C-RNTI, eIMTA-RNTI, TPC-PUCCH-RNTI, TPC-PUSCH-RNTI, M-RNTI, P-RNTI, and SI-RNTI.

The RA-RNTI, C-RNTI, SPS C-RNTI, eIMTA-RNTI, TPC-PUCCH-RNTI, and TPC-PUSCH-RNTI are configured, via higher layer signaling, by the base station apparatus into the terminal apparatus.

The M-RNTI, P-RNTI, and SI-RNTI correspond to a single value. For example, the P-RNTI corresponds to a PCH and a PCCH, and is used to notify changes in paging and system information. The SI-RNTI corresponds to a DL-SCH and a BCCH, and is used to broadcast system information. The RA-RNTI corresponds to a DL-SCH, and is used for a random access response.

The RA-RNTI, C-RNTI, SPS C-RNTI, temporary C-RNTI, eIMTA-RNTI, TPC-PUCCH-RNTI, and TPC-PUSCH-RNTI are configured with higher layer signaling.

The M-RNTI, P-RNTI, and SI-RNTI are defined with predefined values.

The PDCCH together with a CRC scrambled with each RNTI may correspond to a different transport channel and a logical channel depending on an RNTI value. To put it differently, different information may be indicated depending on the RNTI value.

A single SI-RNTI is used to be addressed in the SIB1, as well as all the SI messages.

The PDSCH is used to transmit Downlink data (Downlink Shared Channel (DL-SCH)). The PDSCH is used to transmit a system information message. Here, the system information message may be cell-specific information. The system information may be included in RRC signaling. The PDSCH may be used to transmit the RRC signaling and the MAC control element.

In addition, the PDSCH may be used for transmission of the third UL grant. For instance, the terminal apparatus may receive (detect) the third UL grant (information contained in the third UL grant) in the PDSCH scheduled by the base station apparatus.

The PMCH is used to transmit multicast data (Multicast Channel (MCH)).

The synchronization signal is used to allow the terminal apparatus to be synchronized to frequency and time domains in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus to perform channel compensation on a downlink physical channel. The downlink reference signal is used in order for the terminal apparatus to obtain the downlink channel state information.

The discovery signal (DS) is used for time-frequency synchronization, cell identification, and/or Radio Resource Management (RRM) measurement (intra- and/or inter-frequency measurement) at a frequency in which parameters associated with the DS are configured. In addition, the DS includes multiple signals, which are transmitted at the same frequency. The DS is constituted by use of the resource of PSS/SSS/CRS, and may be constituted further by use of the resource of the CSI-RS. In the DS, the RSRP and/or the RSRQ may be measured by use of the resource where the CRS and/or the CSI-RS are mapped.

The BCH, the MCH, the UL-SCH, and the DL-SCH are transport channels. Channels used in the medium access control (MAC) layer are referred to as transport channels. A unit of the transport channel used in the MAC layer is also referred to as a transport block (TB) or a MAC Protocol Data Unit (MAC PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and coding processing is performed for each codeword.

The PUCCH and/or the sPUCCH is used for transmitting (or feeding back) uplink control information (UCI). Hereinafter, the PUCCH may include the sPUCCH. Here, the UCI may include channel state information (CSI) used for indicating a downlink channel state. The UCI may include scheduling request (SR) used for requesting an UL-SCH resource. The UCI may include Hybrid Automatic Repeat request ACKnowledgement (HARQ-ACK).

Here, the HARQ-ACK may indicate HARQ-ACK for downlink data (Transport block, Medium Access Control Protocol Data Unit (MAC PDU), Downlink-Shared Channel (DL-SCH), or Physical Downlink Shared Channel (PDSCH)). In other words, the HARQ-ACK may indicate acknowledgment (ACK, positive-acknowledgment) or Negative-acknowledgment (NACK). In addition, the CSI may be constituted of a channel quality indicator (CQI), a precoding matrix indicator (PMI), and/or rank indication (RI). The HARQ-ACK may be referred to as the HARQ-ACK response.

The format of the PUCCH may be defined depending upon the kind of and/or the combination of UCI to be transmitted.

A PUCCH format 1 is used for transmitting a positive SR.

A PUCCH format 1a is used for transmitting 1-bit HARQ-ACK. However, in the case of FDD or FDD-TDD primary cell FS1, the PUCCH format 1a is used for transmitting 1-bit HARQ-ACK with a positive SR. It should be noted that the FDD-TDD primary cell FS indicates the FS of the primary cell in a case that FDD-TDD CA is performed. To put it differently, the FDD-TDD primary cell FS is the primary cell of an FS in FDD-TDD CA. Similar things may be applied to secondary cells.

PUCCH format 1b is used for transmitting 2-bit HARQ-ACK or for transmitting 2-bit HARQ-ACK with a positive SR.

In addition, the PUCCH format 1b may be used for transmitting the HARQ-ACK up to four bits by use of channel selection provided that more than one serving cells are configured to the terminal apparatus or that, in the case of TDD, one serving cell is configured to the terminal apparatus.

In the channel selection, any one of the plurality of PUCCH resources is selected and as a result, even the same bit value can be interpreted differently. For instance, the same bit value may mean different things between the case of a first PUCCH resource and the case of a second PUCCH resource. The channel selection enables the expansion of HARQ-ACK by use of multiple PUCCH resources.

A PUCCH format 2 is used for transmitting a CSI report in a case that the HARQ-ACK is not overlaid.

In addition, the PUCCH format 2 may be used for transmitting a CSI report with the HARQ-ACK for ECP being overlaid.

A PUCCH format 2a is used for transmitting a CSI report with 1-bit HARQ-ACK for NCP being overlaid.

A PUCCH format 2b is used for transmitting a CSI report with 2-bit HARQ-ACK for NCP being overlaid.

In the PUCCH format 2a/2b supporting only NCP, a bit string is mapped to one modulation symbol used for generating DMRS for the PUCCH. To put it differently, in the PUCCH format 2a/2b supporting only NCP, DMRS symbols can be used as symbols allowing data to be assigned.

A PUCCH format 3 is used for transmitting HARQ-ACK of up to 10 bits to FDD or FDD-TDD primary cell FS1, 20-bit HARQ-ACK to TDD, and 21-bit HARQ-ACK to FDD-TDD primary cell FS2.

In addition, the PUCCH format 3 may be used for transmitting 10-bit HARQ-ACK and UCI of up to 11 bits corresponding to a 1-bit positive/negative SR to FDD or FDD-TDD, 20-bit HARQ-ACK and 21-bit UCI corresponding to a 1-bit positive/negative SR to TDD, and HARQ-ACK of up to 21 bits and 22-bit UCI corresponding to a 1-bit positive/negative SR to FDD-TDD primary cell FS2.

In addition, the PUCCH format 3 may be used for transmitting 10-bit HARQ-ACK and UCI of up to 11 bits corresponding to 1-bit positive/negative SR to FDD or FDD-TDD, 20-bit HARQ-ACK and 21-bit UCI corresponding to 1-bit positive/negative SR to TDD, and HARQ-ACK of up to 21 bits and 22-bit UCI corresponding to 1-bit positive/negative SR to FDD-TDD primary cell FS2.

In addition, the PUCCH format 3 may be used for transmitting HARQ-ACK, a 1-bit positive/negative SR (if applicable), and a CSI report.

A PUCCH format 4 is used for transmitting HARQ-ACK, SR (if applicable), and UCI of more than 22 bits containing a periodical CSI report (if applicable).

In addition, the PUCCH format 4 may be used for transmitting more than one CSI reports and SR (if applicable).

A PUCCH format 5 is used for transmitting HARQ-ACK, SR (if applicable), and UCI of more than 22 bits containing a periodical CSI report (if applicable)

In addition, the PUCCH format 5 may be used for transmitting more than one CSI reports and SR (if applicable).

Based on the PUCCH format, the number of corresponding DMRSs and the allocation thereof may be different. For instance, if an NCP is added, 3 DMRSs are allocated in 1 slot for the PUCCH format 1/1a/1b, 2 DMRSs are allocated in 1 slot for PUCCH format 2/2a/2b/3, and 1 DMRS is allocated in 1 slot for the PUCCH format 4/5.

In a case that the PUCCH is transmitted in an SRS subframe and in addition, in a case that the PUCCH format is one to which a shortened format is applied (e.g., formats 1, 1a, 1b, and 3), the PUCCH may be transmitted by making empty the last one symbol or two symbols to which an SRS may possibly be allocated (the last one symbol or two symbols of the second slot in the subframe), that is, in a shortened format.

The PUCCH formats 1/1a/1b and the PUCCH formats 2/2a/2b may be transmitted in the same RB. The cyclic shift for the PUCCH format 1/1a/1b in the RB to be used for transmitting the PUCCH format 1/1a/1b and the PUCCH format 2/2a/2b may be configured individually.

The PUSCH and/or the sPUSCH is used for transmitting uplink data (uplink-shared channel (UL-SCH)). Hereinafter, the PUSCH may include the sPUSCH. Furthermore, the PUSCH may be used for transmitting HARQ-ACK and/or CSI along with the uplink data. Furthermore, the PUSCH may be used for transmitting CSI only, or HARQ-ACK and CSI only. In other words, the PUSCH may be used for transmitting the UCI only.

Here, the base station apparatus and the terminal apparatus may exchange (transmit and/or receive) signals with each other in their respective higher layers. For example, the base station apparatus and the terminal apparatus may transmit and/or receive RRC signaling (also referred to as RRC message or RRC information) in a radio resource control (RRC) layer. The base station apparatus and the terminal apparatus may transmit and receive a medium access control (MAC) control element in a MAC layer. Here, the RRC signaling and/or the MAC control element is also referred to as higher layer signaling.

Here, in the present embodiment, "higher layer parameter," "higher layer message," "higher-layer signal," "higher layer information," and "higher layer information element" may mean the same thing.

In addition, the PUSCH may be used for transmitting the RRC signaling and the MAC control element (MAC CE). Here, the RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user-equipment-specific information may be transmitted by use of signaling dedicated to the certain terminal apparatus.

The PRACH and/or sPRACH is used for transmitting a random access preamble. Hereinafter, the PRACH may include the sPRACH. For instance, the PRACH (or random access procedure) is used mainly to make the terminal apparatus synchronize the time domain with the base station apparatus. In addition, the PRACH (or random access procedure) may be used for transmitting an initial connection establishment procedure, a handover procedure, a connection re-establishment procedure, an uplink transmission synchronization (timing adjustment), and a scheduling request (PUSCH resource request, UL-SCH resource request).

The DMRS is associated with transmission of the PUSCH, the sPUSCH, and/or the PUCCH. The DMRS is time-multiplexed with the PUSCH, the sPUSCH, or the PUCCH. For example, the base station apparatus may use the DMRS in order to perform channel compensation of PUSCH, sPUSCH, or PUCCH. The DMRS may be different in the time-multiplexity allocation and/or the number of multiplexed DMRSs depending upon the kind of physical channel to be demodulated.

The SRS is not associated with the transmission of the PUSCH or the PUCCH. For example, the base station apparatus may use SRS to measure an uplink channel state or a transmission timing. The SRS is either a trigger type 0SRS that is to transmit in a case that associated parameters are configured by a higher-layer signal or a trigger type 1SRS that is to transmit in a case that associated parameters are configured by a higher-layer signal and in addition, in a case that an SRS request contained in an uplink grant demands the transmission.

LTE time unit $T_s$ depends on the subcarrier intervals (e.g., 15 kHz) and the FFT size (e.g., 2048). In the above-mentioned case, $T_s$ is 1/(15000×2048) seconds. The time length of a single slot is 15360·$T_s$ (i.e., 0.5 ms). The time length of a single subframe is 30720·$T_s$ (i.e., 1 ms). The time length of a single radio frame is 307200·$T_s$ (i.e., 10 ms).

The scheduling of a physical channel or a physical signal is managed by use of a radio frame. The time length of a single radio frame is 10 ms. A single radio frame is constituted of 10 subframes. In addition, a single subframe is constituted of 2 slots. The time length of a single subframe is 1 ms, and thus the time length of a single slot is 0.5 ms. Moreover, scheduling is managed by using a resource block as a minimum unit of scheduling for allocating a physical channel. The "resource block" is defined by a section of frequency axis including a certain frequency domain constituted of a set of multiple subcarriers (e.g., 12 subcarriers) and a domain constituted of a certain Transmission Time Interval (TTI, slot, symbol). It should be noted that a single subframe may be referred to as one pair of resource blocks.

In addition, a single TTI may be defined as the number of symbols constituting a single subframe or a single subframe. For instance, in the case of an NCP (Normal Cyclic Prefix), a single TTI may be constituted of 14 symbols. In addition, in the case of an ECP (Extended CP), a single TTI may be constituted of 12 symbols. It should be noted that the TTI may be defined as the reception time interval on the reception side. The TTI may be defined as the unit for transmission or the unit for reception for physical channels and/or physical signals. To put it differently, the time length of the physical channel and/or the physical signal may be defined based on the TTI length. It should be noted that the symbol may include the SC-FDMA symbol and/or the OFDM symbol. In addition, the TTI length may be expressed by use of the number of symbols as its unit. In addition, the TTI length may be expressed in time-length units such as millisecond (ms) or microsecond (µs).

A sequence associated with a physical channel and/or a physical signal is mapped to each symbol. To improve the accuracy of detecting the sequence, a CP is added to the sequence associated with the physical channel and/or physical signal. The CP is either an NCP or an ECP. The added sequence of the ECP is longer than that of the NCP. It should be noted that the length of the sequence associated with CP may be referred to as the CP length.

In a case that the terminal apparatus and the base station apparatus support a function associated with the latency reduction (LR), a single TTI may be constituted of fewer than 14 symbols for NCP (fewer than 12 symbols for ECP). For instance, the TTI length of a single TTI may be constituted of 2, 3, or 7 symbols. A TTI constituted of fewer than 14 symbols for NCP (fewer than 12 symbols for ECP) may be referred to as an sTTI (short TTI, shorter TTI, shortened TTI).

A TTI with 14-symbol TTI length for NCP (12-symbol TTI length for ECP) may be referred to simply as the TTI.

The TTI length of sTTI for downlink transmission (DL-sTTI) may be configured to either a 2-symbol length or 7-symbol length. The TTI length of sTTI for uplink transmission (UL-sTTI) may be configured to any of a 2-symbol length, a 3-symbol length, a 4-symbol length, and a 7-symbol length. The sPDCCH and the sPDSCH may be allocated in the DL-sTTI. It should be noted that the TTI length of the sPUSCH, the TTI length of the sPUCCH, the TTI length of the sPRACH may be configured individually. It should be noted that the TTI length of the sPDSCH may include an sPDCCH symbol and/or a PDCCH symbol. In addition, the TTI length of sPUSCH and/or the TTI length of sPUCCH may contain a DMRS symbol and/or an SRS symbol.

The subcarrier intervals of the above-described various physical channels and/or physical signals may be defined/configured individually for each physical channel and/or physical signal. In addition, the time length of a single symbol of the various physical channels and/or physical signals may be defined/configured individually for each physical channel and/or physical signal. Hence, the TTI length of the various physical channels and/or physical signals may be defined/configured individually for each physical channel and/or physical signal.

In the present embodiment, Carrier Aggregation (CA) that performs communications by use of multiple cells (component carriers corresponding to the cells) may be performed. In the CA, there are: primary cells (P cells) for establishing an initial access and/or an RRC connection; and secondary cells that are added/altered/deleted/(de)activated by use of the primary cells.

In the present embodiment, Dual Connectivity (DC) that performs communications by use of multiple cells (component carriers corresponding to the cells) may be performed. In the DC, the cells that belong to each of the two base station apparatuses (MeNB (master eNB) and SeNB (secondary eNB)) are grouped together. The group of cells belonging to the MeNB and including primary cells is defined as a master cell group (MCG), whereas the group of cells belonging to the SeNB and including primary-secondary cells (PS cells) is defined as a Secondary Cell Group (SCG). The primary-secondary cells refer to the cells that function similarly to the primary cells (secondary cells, which are serving cells other than the primary cells) in a cell group including no primary cell, i.e., the SCG, of a case that multiple cell groups are configured.

The primary cells and the primary-secondary cells play the role of the primary cells in their respective CGs. Here, the primary cells may refer to: the cells to which control channels equivalent to the PUCCHs and/or the PUCCHs can be transmitted and/or assigned; the cells associated with the initial access procedure/the RRC connection procedure/the initial connection establishment procedure; the cells capable of triggering random access procedure by L1 signalling; the cells for monitoring a radio link; the cells supporting the semi-persistent scheduling; the cells for detecting/determining RLF; or the cells that are always activated. It should be noted that in the present embodiment, a cell having the functions of the primary cell and/or the primary-secondary cell may be referred to as a special cell. For LR cells, the primary cell/the primary-secondary cell/the secondary cell may be defined similarly to those for the LTE.

In an aspect of the present invention, the time domain may be expressed by use of the time length and/or the number of symbols as its unit. In addition, the frequency domain may be expressed by use of the bandwidth, the number of subcarriers, the number of resource elements in the frequency direction, and/or the number of resource blocks.

In the LR cell, the TTI size may be changeable based on the subframe type, the higher layer configuration information and/or the control information contained in the L1 signalling.

In the LR cell, an access without the need for a grant may be possible. It should be noted that the access without the need for a grant refers to an access without using any control information (DCI format, downlink grant, uplink grant) indicating the schedule of PDSCH and PUSCH (shared channels shared by downlink and uplink/data channel). Hence, in the LR cell, access scheme where no dynamic resource assignment or transmission instruction by use of the PDCCH (downlink control channel) is performed may be applied.

In the LR cell, based on the functions (performance, abilities) of the terminal apparatus and configuration from the base station apparatus, the terminal apparatus may perform HARQ-ACK and/or CSI feedback corresponding to the downlink resource (signal, channel) by use of the uplink resource (signal, channel) mapped in the same subframe. It should be noted that in this subframe, the reference resource concerning the CSI for the CSI measurement result in a certain CSI may be the CRS or the CSI-RS of the same subframe. Such a subframe may be referred to as a self-contained subframe.

It should be noted that a self-contained subframe may be constituted of one or more consecutive subframes. Hence, a self-contained subframe may be constituted of multiple subframes or may be a single transmission burst that is constituted of multiple subframes. The last subframe (or the last subframes including the very last one) that the self-contained subframe may preferably be constituted of an uplink subframe or a special subframe. Hence, it is preferable that an uplink signal/channel be transmitted in this very last subframe.

In a case that the self-contained subframe is constituted of multiple downlink subframes as well as a single uplink subframe or a single special subframe, the HARQ-ACK for each of the plurality of downlink subframes may be transmitted through the UpPTS of the single uplink subframe or of the single special subframe.

Based on whether a signal was successfully received (demodulated and decoded), the communication device determines either ACK or NACK for the signal. The ACK indicates that a signal was successfully received in the communication device, while NACK indicates that no signal was successfully received in the communication device. Having received a feedback of an NACK, the communication device may retransmit the signal of NACK. Based on the content of the HARQ-ACK for the PUSCH transmitted from the base station apparatus, the terminal apparatus determines whether to retransmit the PUSCH. Based on the content of the HARQ-ACK for the PDSCH or the PDCCH/EPDCCH transmitted from the terminal apparatus, the base station apparatus determines whether to retransmit the PDSCH. The ACK/NACK for the PUSCH transmitted by the terminal apparatus is fed back to terminal apparatus by use of a PDCCH or a PHICH. The ACK/NACK for the PDSCH or the PDCCH/EPDCCH transmitted by the base station apparatus is fed back to the base station apparatus by use of a PUCCH or a PUSCH.

It should be noted that in an aspect of the present invention, the subframe represents the unit for transmission and/or the unit for reception of the base station apparatus and/or of the terminal apparatus.

The base station apparatus may determine that the terminal apparatus is a Latency Reduction (LC) device, based on a Logical Channel ID (LCID) for a Common Control Channel (CCCH) and on the capability information (performance information, function information) of the terminal apparatus.

In a case that the terminal apparatus and/or the base station apparatus supports the abilities associated with the LR, the processing time (processing delay, latency) may be determined based on the length of the TTI (number of symbols) used in the reception signal and/or the transmission signal. Hence, the processing time of the terminal apparatus and/or of the base station apparatus supporting the abilities associated with the LR may be variable based on the TTI length for the reception signal and/or for the transmission signal.

The S1 signalling has been extended including terminal radio capability information for paging. In a case that such paging-specific capability information is provided by the base station apparatus to a Mobility Management Entity (MME), the MME may use this information to indicate to the base station apparatus that a paging request from the MME is related to the LR terminal. The identifier may also be referred to as an ID (identity).

In a case that the base station apparatus (EUTRAN) needs the capability information of the terminal apparatus (UE radio access capability, UE EUTRA capability) a procedure for the terminal apparatus in a connected mode is initiated. The base station apparatus inquires for the capability information of the terminal apparatus. In response to the inquiry, the terminal apparatus transmits the capability information of the terminal apparatus. The base station apparatus determines whether the capability information is supported. In a case that the capability information is supported, the base station apparatus transmits configuration information corresponding to the capability information via, for example, higher layer signalling, to the terminal apparatus. Once the configuration information corresponding to the capability information has been configured, the terminal apparatus determines that transmission/reception based on the function can be performed.

Parameters for the configuration of the physical channel and/or of the physical signal may be configured in the terminal apparatus as higher layer parameters via the higher layer signalling. In addition, some parameters for the configuration of the physical channel and/or of the physical signal may be configured in the terminal apparatus via the L1 signalling (physical layer signalling, such as PDCCH/EPDCCH), such as a DCI format and grant. In addition, as the parameters for the configuration of the physical channel and/or of the physical signal, a default configuration or default values may be configured, in advance, in the terminal apparatus. In addition, once the parameters for the configuration are notified by use of the higher layer signalling, the terminal apparatus may update the default values. In addition, the kind of higher layer signalling/message to be used for the notification may vary depending on the corresponding configuration. For instance, the higher layer signalling/message may include an RRC message, broadcast information, system information, and/or the like.

In a case that the base station apparatus transmits a DS at an LAA frequency, the base station apparatus may map the data information and/or the control information in the DS occasion. The data information and/or the control information may contain information on the LAA cell. For example, data information and/or the control information may contain the frequency to which the LAA cell belongs, the cell ID, the load, the congestion degree, the interference/transmit power, the channel occupation time, and/or the buffer state relating to the transmission data.

In a case that the DS is measured at the LAA frequency, the resource to be used for each signal included in the DS may be extended. For instance, the CRS may use the resource corresponding not only to the antenna port 0 but also to the antenna port 2, 3, or the like. In addition, also the CSI-RS may use the resource corresponding not only to the antenna port 15 but also to the antenna port 16, 17, or the like.

In a case that in the LR cell, the resource for the DS is configured in the terminal apparatus, by use of either a higher-layer signal (RRC signaling) or the system information, whether to receive the DS may be dynamically instructed to the terminal apparatus by use of L1 signalling (the control information corresponding to the field with the PDCCH or the DCI format) or L2 signalling (the control information corresponding to the MAC CE), that is, a lower-layer signal (a signal of a layer that is lower than the RRC layer).

In the LR cell, the RS for demodulation/decoding and the RS for CSI measurement may share a shared resource or may use different resources if the resources are defined individually.

Next, a cell search according to the present embodiment will be described.

In the LTE, a cell search is a procedure to perform the time-frequency synchronization of the cell where the terminal apparatus is present and to detect the cell ID of the cell. The EUTRA cell search supports all the expandable transmission bandwidth capable of corresponding to 72 or more subcarriers. The EUTRA cell search is performed in the downlink based on the PSS and the SSS. The PSS and the SSS are transmitted by use of the 72 subcarriers at the center of the bandwidth of the first subframe and of the sixth subframe in each radio frame. The neighboring cell search is performed, as an initial cell search, based on the identical downlink signal.

If in the LR, a stand-alone communication is performed, a cell search that is similar to the one mentioned above may be performed.

Next, a physical-layer measurement according to the present embodiment will be described.

In the LTE, the physical-layer measurement includes: a measurement, in the EUTRAN, of the intra-frequency and inter-frequency (RSRP/RSRQ); a measurement associated with the time difference between reception and transmission by the terminal apparatus as well as the time difference between reference signals used for the positioning of the terminal apparatus (RSTD); and a measurement between RATs (EUTRAN-GERAN/UTRAN); a measurement between systems (EUTRAN-non 3GPP RAT). The physical-layer measurement is used for supporting the mobility. In addition, the EUTRAN measurement includes a measurement performed by the terminal apparatus in the idle mode and a measurement performed by the terminal apparatus in the connected mode. The terminal apparatus performs the EUTRAN measurements at a proper measurement gap and is in synchronization with the cell in which the EUTRAN measurements are performed. It should be noted that because these measurements are performed by the terminal apparatus, the measurements may be referred to as a terminal-apparatus measurement.

The terminal apparatus may support at least two physical quantities (RSRP, RSRQ) for the measurement in the EUTRAN. In addition, the terminal apparatus may support a physical quantity associated with the RSSI. Based on the parameters for a physical quantity configured as higher-layer parameters, the terminal apparatus may perform a corresponding measurement.

The physical-layer measurement is used for supporting the mobility. For instance, the physical-layer measurement includes: a measurement, in the EUTRAN, of the intra-frequency and inter-frequency (RSRP/RSRQ); a measurement associated with the time difference between reception and transmission by the terminal apparatus as well as the time difference between reference signals used for the positioning of the terminal apparatus (RSTD); a measurement between RATs (EUTRAN-GERAN/UTRAN); and a measurement between systems (EUTRAN-non 3GPP RAT). For instance, the physical-layer measurement includes: a measurement of intra- and inter-frequency handover as well as a measurement of inter-RAT handover, a timing measurement, an RRM measurement, a positioning measurement provided that the positioning is supported. It should be noted that the a measurement of inter-RAT handover is also defined in the support for the handover to the GSM (registered trademark), the UTRA FDD, the UTRA TDD, CDMA2000, 1×RTT, CDMA2000 HRPD, and IEEE802.11. The EUTRAN measurement is used for supporting the mobility. In addition, the EUTRAN measurement includes a measurement performed by the terminal apparatus in the idle mode and a measurement performed by the terminal apparatus in the connected mode. For instance, the RSRP and the RSRQ may be measured for each of the intra- and the inter-frequencies regardless of which of the idle mode and the connected mode the terminal apparatus is in. The terminal apparatus performs the EUTRAN measurements at a proper measurement gap and is in synchronization with the cell in which the EUTRAN measurements are performed.

The physical-layer measurement includes a measurement of the radio characteristics by means of the terminal apparatus and of the base station apparatus and a report to the higher layer within the network.

Next, the processing time (latency) of the terminal apparatus and/or the base station apparatus according to the present embodiment will be described.

In the present embodiment, phrases such as "CP is added to OFDM symbol and/or to SC-FDMA symbol" may have the same meaning as the phrase "the sequence of CP is added to the sequence of the physical channel transmitted on the OFDM symbol and/or on the SC-FDMA symbol."

The processing time is determined based on the time needed for receiving and decoding the detected signal and the time needed for generating (modulating and/or coding) the signal to be transmitted. By shortening the TTI length of the reception signal and the TTI length of the transmission signal, the terminal apparatus and the base station apparatus can shorten the time needed for decoding and the time for generating the signal to be transmitted.

In the present embodiment, in a case that the terminal apparatus supports the transmission and/or the reception by use of the sTTI, the terminal apparatus can shorten the processing time for a TTI constituted of 14 symbols where an NCP is added to an OFDM symbol and/or to an SC-FDMA symbol. Whether to shorten the processing time for a TTI may be configured via the higher layer signalling. Hence, the base station apparatus may be configured to shorten the processing time for transmission to and/or reception from TTI and/or sTTI in a case that based on the capability information transmitted from the terminal apparatus, the base station apparatus determines that the terminal apparatus in a cell is capable of supporting sTTI. It should be noted that terminal apparatus may support individually the capability of shortening the processing time for the transmission and the capability of shortening the processing time for the reception. In addition, the terminal apparatus may indicate whether the capability of shortening the processing time for transmission is supported and whether the capability of shortening the processing time for reception is supported. In addition, the processing for transmission and the processing for reception may be also referred to as the uplink processing and the downlink processing, respectively.

Whether the processing time is dynamically changed depending on the TTI length of the physical channel or reduced based on the higher layer parameters may be configured by the base station apparatus via the higher layer signalling.

Here, such phrase as "the terminal apparatus supports the transmission by use of the sTTI" has the same meaning as the terminal apparatus supporting the transmission of at least one physical channel among the sPUSCH, sPUCCH, and sPRACH. In addition, phrases such as "the terminal apparatus supports the reception by use of the sTTI" has the same meaning as the terminal apparatus supporting the reception of at least one physical channel of the sPDSCH and sPDCCH.

Whether the sTTI is supported for each of the physical channels may be indicated. The terminal apparatus may indicate, by use of the capability information, whether the transmission and/or the reception is supported by use of sTTI for each of the physical channels.

Next, an exemplar HARQ-ACK procedure for downlink transmission (PDSCH, sPDSCH) according to the present embodiment will be described. In the present embodiment, the following description assumes a case that an NCP is added to an OFDM symbol and/or to an SC-FDMA symbol (hence, that a single slot is constituted of 7 symbols, and that a single subframe is constituted of 14 symbols). The description may also be applied to the cases of ECP addition.

The transmission timing of the HARQ-ACK for the PDSCH and/or for the sPDSCH may be determined based on the TTI length of the PDSCH and/or on the TTI length of sPDSCH, that is, based on the number of symbols that the PDSCH and/or the sPDSCH is constituted of. It should be noted that the sPDSCH may have the same meaning as the downlink sTTI.

In a case that the TTI length of the PDSCH and/or of the sPDSCH is 14 symbols, and in addition, in a case that the terminal apparatus detects a PDSCH and/or an sPDSCH in the subframe n−4 for FDD, the terminal apparatus transmits the corresponding HARQ-ACK in the subframe n by use of PUCCH and/or sPUCCH. In a case that the corresponding HARQ-ACK is transmitted through the sPUCCH, the sPUCCHs within the subframe n that is used for the transmission of such an HARQ-ACK may be indicated based on the TTI lengths of the sPUCCHs, the higher layer parameters, and/or the information contained in the DCI format.

In a case that the TTI length of the sPDSCH is 7 symbols, and in addition, in a case that the terminal apparatus detects a PDSCH and/or an sPDSCH in the subframe n−$k_1$ for FDD, the terminal apparatus transmits the corresponding HARQ-ACK in the subframe n by use of the PUCCH and/or of the sPUCCH. In a case that the HARQ-ACK corresponding to the sPDSCH is transmitted through the sPUCCH, the sPUCCHs within the subframe n that is used for the transmission of such an HARQ-ACK may be indicated based on the TTI lengths of the sPUCCHs, the higher layer parameters, and/or the information contained in the DCI format. The value of $k_1$ is smaller than 4, and may be determined based on the TTI length of the sPDSCH.

In a case that the TTI length of the sPDSCH is 2 symbols, and in addition, in a case that the terminal apparatus detects a PDSCH and/or an sPDSCH in the subframe n−$k_2$ for FDD, the terminal apparatus transmits the corresponding HARQ-ACK in the subframe n by use of the PUCCH and/or of the sPUCCH. In a case that the corresponding HARQ-ACK is transmitted through the sPUCCH, the sPUCCHs within the subframe n that is used for the transmission of such an HARQ-ACK may be indicated based on the TTI lengths of the sPUCCHs and/or the higher layer parameters. The value of $k_2$ is smaller than the value of $k_1$, and may be determined based on the TTI length of the sPDSCH.

It should be noted that the transmission timing of the HARQ-ACK for the sPDSCH may be determined based not only on the TTI length of the sPDSCH but also on the TTI length of the sPUCCH. Hence, the transmission timing may be determined by considering not only the processing time for the reception processing of the terminal apparatus but also the processing time for the transmission processing of the terminal apparatus.

The transmission timing of the HARQ-ACK for the sPDSCH may be defined as described in FIG. 7. FIG. 7 is a chart describing a transmission timing of the HARQ-ACK relative to the sPDSCH according to the present embodiment. In the equation, $n_f$ represents the radio frame number (system frame number). In addition, $n_s$ represents a slot number. By use of a floor function, the subframe number is shown from the slot number. The symbol l represents the start symbol number of downlink sTTI (DL sTTI) or sPDSCH. A possible start symbol number of the sPUCCH or of the sPUSCH, which corresponds to the transmission timing of the HARQ-ACK for the sPDSCH, is obtained by adding prescribed processing time k to the start symbol number of the DL sTTI or of the sPDSCH. Hence, a possible start symbol number of the sPUCCH or of the sPUSCH, which corresponds to the transmission timing of the HARQ-ACK for the sPDSCH, may be the first uplink sTTI after the start symbol number of the DL sTTI or of the sPDSCH plus k. The value of k may be determined based on the DL sTTI or the TTI length of the sPDSCH, based on the combination of the DL sTTI or the TTI length of the sPDSCH and a configured TA value, or based on the combination of the DL sTTI or the TTI length of the sPDSCH and the uplink sTTI (UL sTTI) or the TTI length of the sPUSCH/sPUCCH. Alternatively, the value of k may be configured as a higher layer parameter. In addition, the value of k may include a value determined by considering the minimum processing time of the terminal apparatus. It should be noted that the value of k may include the reception time of the reception signal.

It should be noted that the timing for retransmitting the sPDSCH, that is, HARQ round trip time (HARQ RTT), may be determined based on the TTI length of the sPDSCH and the TTI length of the sPUCCH. Hence, HARQ RTT may be determined not only by considering the processing time for the reception processing of the terminal apparatus and the processing time for the transmission processing of the terminal apparatus but also by considering the processing time for the reception processing of the base station apparatus and the processing time for the transmission processing of the base station apparatus.

Next, another exemplar HARQ-ACK procedure for downlink transmission (PDSCH, sPDSCH) according to the present embodiment will be described.

Here, an HARQ-ACK procedure will be described for a case that the processing time of the terminal apparatus is configured via the higher layer signalling in a case that both the terminal apparatus and the base station apparatus support the transmission and/or the reception by use of the sTTI.

In a case that the TTI length of the PDSCH and/or of the sPDSCH is 14 symbols, the terminal apparatus transmits, in the subframe n by use of the PUCCH resource or the sPUCCH, the HARQ-ACK for the transmission of the PDSCH and/or the sPDSCH indicated, in the subframe n−4, by the detection of the corresponding PDCCH and/or sPDCCH. The transmission is targeted to a cell which is frequency division duplexed (FDD) and which is a single configured serving cell, that is, to a single FDD cell. To put it differently, in a case that the terminal apparatus detects, in the subframe n−4, the PDSCH and/or the sPDSCH, the terminal apparatus transmits, in the uplink subframe of the subframe n by use of the PUCCH, the HARQ-ACK for the PDSCH and/or the sPDSCH detected in the subframe n−4. The PUCCH resource and/or the sPUCCH resource is determined based on the higher layer parameters associated with the configuration of the PUCCH and on the lowest index of the CCE constituting the detected PDCCH or sPDCCH.

In a case that the TTI length of the PDSCH and/or of the sPDSCH is 14 symbols, and in addition, in a case that the shortening of the processing time of the terminal apparatus is configured, the terminal apparatus transmits, in the subframe n by use of the PUCCH resource or of the sPUCCH resource, the HARQ-ACK for the transmission of the PDSCH and/or sPDSCH indicated, in the subframe n−$k_1$ ($k_1$ is a smaller value than 4, that is, any integer from 1 to 3), by the detection of the corresponding PDCCH and/or sPDCCH. The transmission is targeted to a cell which is frequency division duplexed (FDD) and which is a single configured serving cell. The value of $k_1$ may be determined based on the shortened processing time of the terminal apparatus, or may be configured as a higher layer parameter. It should be noted that the sPUCCH resource may be determined based on the higher layer parameters associated with the configuration of the sPUCCH and on the lowest index of the CCE constituting the detected sPDCCH.

In a case that the TTI length of the PDSCH and/or of the sPDSCH is shorter than 14 symbols, that is, in a case that the PDSCH transmission is performed with the sTTI (i.e., sPDSCH transmission is performed), and in addition, the shortening of the processing time of the terminal apparatus is configured, the terminal apparatus transmits, in the subframe n by use of the sPUCCH resource, the HARQ-ACK for the sPDSCH transmission indicated, in the subframe n−$k_1$ or in the subframe n−$k_2$ (the value of $k_2$ is a smaller value than 4, that is, any integer from 1 to 3, and is a value equal to or smaller than the value of $k_1$), by the detection of the corresponding PDCCH and/or sPDCCH. The transmission is targeted to a cell which is frequency division duplexed (FDD) and which is a single configured serving cell. The value of $k_2$ may be determined based on the shortened processing time of the terminal apparatus, or may be configured as a higher layer parameter. It should be noted that the sPUCCH resource may be determined based on the higher layer parameters associated with the configuration of the sPUCCH and on the lowest index of the CCE constituting the detected sPDCCH.

Here, in a case that more than one sPDSCHs are detected in the subframe n−$k_2$, the sPUCCH format in the subframe n may be determined based on the higher layer parameters, on the prescribed table, or on the number of symbols that the sPUCCH is constituted of.

The sPUCCH format may be defined based on the number of HARQ-ACKs for the sPDSCH detected in (a) certain subframe(s) (a single subframe or two subframes) of a single serving cell. For instance, in a case that the number of HARQ-ACKs for the sPDSCH detected in (a) certain subframe(s) of a single serving cell is one, the corresponding sPUCCH format may be referred to as a first sPUCCH format. In addition, in a case that the number of HARQ-ACKs for the sPDSCH detected in (a) certain subframe(s) of a single serving cell is more than one, the corresponding sPUCCH format may be referred to as a second sPUCCH format. A case that the number of HARQ-ACKs for the sPDSCH detected in a single subframe includes a case that the number of sPDSCHs is more than one.

In addition, the number of HARQ-ACKs for the sPDSCH capable of being transmitted (fed back) through a single sPUCCH (a single sPUCCH format) may be determined based on the number of symbols that the sPUCCH is constituted of and on the number of symbols that the sPDSCH is constituted of. For instance, in a case that the sPUCCH is constituted of 7 symbols, and in addition, the sPDSCH is constituted of 7 symbols and/or 14 symbols, the number of HARQ-ACKs for the sPDSCH in a single subframe transmitted through the sPUCCH may be one. In addition, in a case that the sPUCCH is constituted of 7 symbols, and in addition, the sPDSCH is constituted of 2 symbols, the number of HARQ-ACKs for the sPDSCH in a single subframe transmitted through the sPUCCH may be more than one.

Next, another exemplar HARQ-ACK procedure for downlink transmission (sPDSCH) according to the present embodiment will be described.

In a case that the TTI length of the sPDSCH and the TTI length of the sPUCCH are configured individually for a single FDD cell, and in addition, in a case that multiple sPDSCHs are detected in the subframe n−k, the corresponding HARQ-ACK may be transmitted in the subframe n by use of the PUCCH format 1b or by use of the PUCCH format 1b with a channel selection, or by use of the PUCCH format 3. Hence, in a case that the sPDSCH and/or the sPUCCH is configured, the PUCCH format 1b or the PUCCH format 3 may be used for transmitting the HARQ-ACK of 2 or more bits for a single subframe in a single serving cell. It should be noted that the number of sPDSCHs detected in the subframe n−k and the number of corresponding HARQ-ACKs may be used to determine which the following options is used in the subframe n: the PUCCH format 1; the PUCCH format 1a; the PUCCH format 1b; the PUCCH format 1b with a channel selection; and the PUCCH format 3.

The following description assumes that the HARQ-ACK corresponding to the sPDSCH may be transmitted by use of a prescribed PUCCH format irrespective of the TTI length of the PUCCH, that is, irrespective of whether the PUCCH in question is a PUCCH or an sPUCCH.

In a case that in the subframe n−k, a single sPDSCH is detected for a single FDD cell, terminal apparatus may transmit the corresponding HARQ-ACK in the subframe n by use of the PUCCH format 1a.

In a case that in the subframe n–k, two sPDSCHs are detected for a single FDD cell, the terminal apparatus may transmit the corresponding HARQ-ACK in the subframe n by use of the PUCCH format 1b.

In a case that in the subframe n–k, up to 4 sPDSCHs are detected for a single FDD cell, the terminal apparatus may transmit the corresponding HARQ-ACK in the subframe n by use of the PUCCH format 1b with a channel selection.

Figure 3:
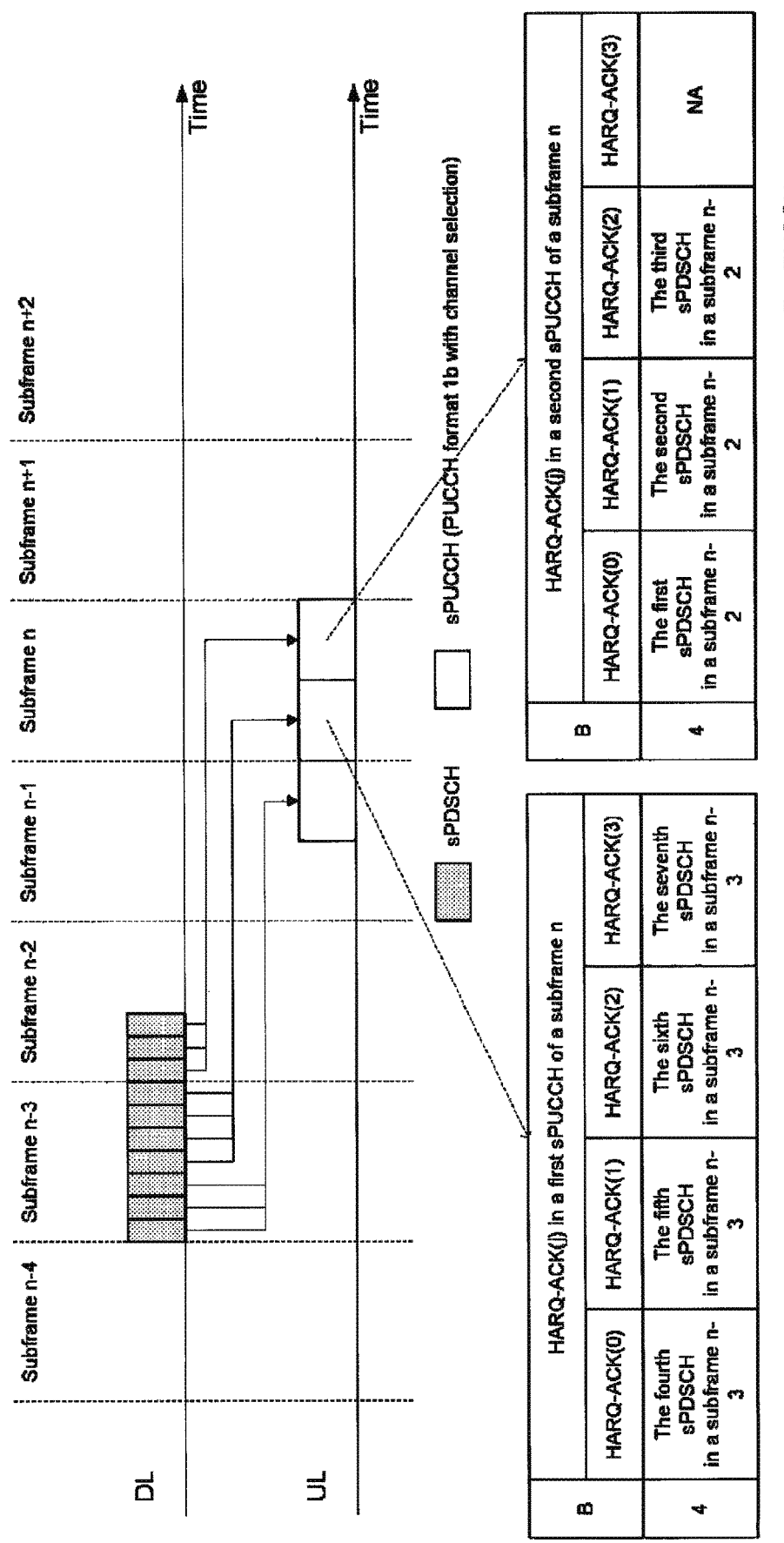
FIG. 3 is a chart illustrating the correspondence relationship between the PUCCH format 1b with a channel selection with 7-symbol configuration and the 2-symbol sPDSCH according to the first embodiment.

FIG. 3 is a chart illustrating the correspondence relation between the PUCCH format 1b with a channel selection with 7-symbol configuration and the 2-symbol sPDSCH according to the present embodiment. The PUCCH format 1b with a channel selection supports the transmission of HARQ-ACK of up to 4 bits by use of 4 sPUCCH resources. The PUCCH format 1b with a channel selection transmitted through the sPUCCH of each slot may be used for transmitting the HARQ-ACK for 4 or 3 sPDSCHs. In a case that multiple sPDSCHs are detected in a single subframe, a table such as the one shown in FIG. 3 may be prescribed provided that there is a limit to the HARQ-ACK bits that can be mapped in a single PUCCH format. The table may be configured as higher layer parameters or as fields of the DCI format. It should be noted that FIG. 3 assumes that the shortened processing time of the terminal apparatus is 2 subframes (2 ms).

In a case that in the subframe n–k, 4 or more sPDSCHs are detected for a single FDD cell, the terminal apparatus may transmit the corresponding HARQ-ACK in the subframe n by use of the PUCCH format 3.

In a case that in the subframe n–k, up to seven sPDSCHs are detected for a single FDD cell, the terminal apparatus may transmit the corresponding HARQ-ACK in the subframe n by use of the PUCCH format 2b.

In addition, in a case that in the subframe n–k, up to seven sPDSCHs are detectable for a single FDD cell and/or in a case that in the subframe n–k+1, up to seven sPDSCHs are detectable for a single FDD cell, the terminal apparatus may transmit the corresponding HARQ-ACK for the seven sPDSCHs in the subframe n by use of the PUCCH format 2b that is constituted of 7 symbols (i.e., of the sTTI of 7 symbols). Which sPDSCH in which subframe each HARQ-ACK bit (HARQ-ACK (j)) corresponds to may be indicated via the higher layer signalling or may be prescribed. For instance, the relations of individual HARQ-ACK bits to the sPDSCHs may be indicated based on the table shown in FIG. 4. It should be noted that the HARQ-ACK bit value may be set to a bit value corresponding to "1" to indicate ACK, and that the HARQ-ACK bit value may be set to a bit value corresponding to "0" to indicate NACK. In addition, in a case that a value of HARQ-ACK bit indicates a discontinuous transmission (DTX), it is not necessary to set the corresponding bit. These are some possible examples and other combinations than those shown above may be acceptable.

FIG. 4 illustrates the mapping of sPDSCHs in a certain subframe of a certain serving cell to the HARQ-ACK (j) for a PUCCH format 2b in a case that one or more sPDSCHs are detectable for a single subframe according to the present embodiment. FIG. 4 illustrates a case that 7 HARQ-ACK bits can be configured in a single PUCCH format 2b. The relationship between individual HARQ-ACK bits and sPDSCHs may be defined based on indexes. Alternatively, indexes may be configured as higher-layer parameters. The abbreviation NA (not available or not applicable) in FIG. 4 means that no sPDSCH is allocated in a domain where a PDCCH and/or an sPDCCH is allocated and thus there is no corresponding HARQ-ACK. It should be noted that the abbreviation NA in FIG. 4 may mean that there is a domain of a PDCCH and/or an sPDCCH.

Whether the terminal apparatus transmits, in the subframe n by use of a single PUCCH or of a single PUCCH format, the HARQ-ACK for multiple sPDSCH in the subframe n–k of a single FDD cell may be determined based on higher layer parameters.

In addition, in a case that the TTI length of PUCCH format 1/1a/1b/3 is configured to 7 symbols (1 slot), the terminal apparatus can transmit by two time-multiplexed PUCCH formats in the subframe n. In a case that a PUCCH format 1/1a/1b/3 configured to 7 symbols is configured, the PUCCH format 1/1a/1b/3 transmitted in a first slot of the subframe n may be used for transmitting the HARQ-ACK for the sPDSCH in the subframe n–k, and the PUCCH format 1/1a/1b/3 transmitted in a second slot of the subframe n may be used for transmitting the HARQ-ACK for the sPDSCH in the subframe n–k+1.

In addition, in a case that the TTI length of PUCCH format 2/2a/2b is configured to 7 symbols (1 slot), the terminal apparatus can transmit by two time-multiplexed PUCCH formats in the subframe n. In a case that a PUCCH format 2/2a/2b configured to 7 symbols is configured, the PUCCH format 2/2a/2b transmitted in a first slot of the subframe n may be used for transmitting the HARQ-ACK for the sPDSCH in the subframe n–k, and the PUCCH format 2/2a/2b transmitted in a second slot of the subframe n may be used for transmitting the HARQ-ACK for the sPDSCH in the subframe n–k+1.

Now suppose a case that the TTI length of the sPDSCH is shorter than the TTI length of the sPUCCH, that is, a case that the sPDSCH has fewer symbols than the sPUCCH. Specifically, suppose a case, for instance, that the TTI length of the sPDSCH is two symbols and the TTI length of the sPUCCH is seven symbols. In this case, the terminal apparatus can detect up to seven sPDSCHs in a single subframe. The terminal apparatus may determine, based on higher layer parameters, whether to transmit HARQ-ACKs for the 7 sPDSCH by use of a single PUCCH format 3 or by use of two PUCCH formats 1b with a channel selection (that is, transmit the HARQ-ACKs for the 7 sPDSCHs by dividing the HARQ-ACKs into two groups). The use of the PUCCH format 3 allows the PUCCH resource to be minimized. The use of the PUCCH format 1b, however, enables quicker transmission of the corresponding HARQ-ACK than in the case of the PUCCH format 3 although the number of HARQ-ACKs that can be transmitted is limited in comparison to the case of the PUCCH format 3.

Now suppose a case that the TTI length of the sPDSCH is longer than or equal to the TTI length of the sPUCCH, that is, a case that the number of symbols that the sPDSCH has is more than or equal to the number of symbols that the sPUCCH has. Specifically, suppose a case, for instance, that the TTI length of the sPDSCH is seven symbols and the TTI length of the sPUCCH is two symbols. In this case, the terminal apparatus can detect up to two sPDSCHs in a single subframe. In such a case, the terminal apparatus may transmit the HARQ-ACK for the sPDSCH by use of the PUCCH format 1a. Hence, the terminal apparatus enables quicker transmission of the corresponding HARQ-ACK due to the reduced processing time for the reception signal.

In a case that the TTI length of the sPDSCH is longer than or equal to the TTI length of the sPUCCH, the sPUCCH or the PUCCH for the HARQ-ACK may be prescribed separately from the sPUCCH or the PUCCH for the CSI. For instance, the sPUCCH or the PUCCH for the HARQ-ACK may be referred to as a type-1 PUCCH/sPUCCH, whereas the sPUCCH or the PUCCH for the CSI may be referred to as a type-2 PUCCH/sPUCCH. In a case that the terminal apparatus supports simultaneous transmission of a type-1 PUCCH and a type-2 PUCCH, that is, in a case that the terminal apparatus supports simultaneous transmission of the HARQ-ACK and the CSI, the terminal apparatus can transmit a type-1 PUCCH and a type-2 PUCCH simultaneously in the same subframe. It should be noted that the type-1 PUCCH and the type-2 PUCCH may have different resources from each other, that is, the resource for the type-1 PUCCH and the resource for the type-2 PUCCH may be configured separately. In addition, the TTI length of the type-1 PUCCH and the TTI length of the type-2 PUCCH may be different from each other, that is, these TTI lengths may be set separately.

It should be noted that in a case that simultaneous transmission of a type-1 PUCCH and a type-2 PUCCH is possible, the type-1 PUCCH and the type-2 PUCCH may be transmitted by use of different antenna ports.

In a case that the sPDSCH and the sPUCCH are configured, the terminal apparatus may transmit the HARQ-ACK for each sPDSCH by use of a PUCCH format X1. For instance, in a case that the PUCCH format X1 is constituted of 7 symbols, the HARQ-ACK of up to 7 bits may be transmittable. It should be noted that the PUCCH format X1 may be used in a case that the resource associated with the PUCCH format X1 is configured as a higher layer parameter. In addition, in a case that the PUCCH format X1 is constituted of 2 symbols, the HARQ-ACK of up to 2 bits may be transmittable. In addition, in a case that the PUCCH format X1 is constituted of 2 symbols, an increased number of PUCCH resources (resources in the frequency direction) may be employed to increase the transmittable HARQ-ACK bit number.

The PUCCH format may be interpreted differently depending on the configured TTI length. For instance, in a case that the PUCCH format is configured for an sTTI (TTI length of fewer than 14 symbols), that is, in a case that a PUCCH format corresponding to sTTI is configured, the PUCCH format may include at least a HARQ-ACK for the sPDSCH. For instance, the PUCCH format corresponding to the sTTI may include an additional content as follows.

In a case that the PUCCH format 1b is configured for an sTTI and in addition, in a case that a single serving cell is configured, the PUCCH format 1b may be used for transmitting an HARQ-ACK of up to 2 bits. In a case that, for instance, two sPDSCHs are time-multiplexed in a single subframe, the PUCCH format 1b may be used for transmitting an HARQ-ACK.

In a case that a PUCCH format 1b with a channel selection is configured for an sTTI, and in addition, in a case that a single serving cell (a single FDD cell) is configured, the PUCCH format 1b with a channel selection may be used for transmitting an HARQ-ACK of up to 4 bits. In a case that for instance, 4 sPDSCHs are time-multiplexed in a single subframe, the PUCCH format 1b with a channel selection may be used for transmitting an HARQ-ACK corresponding to each. It should be noted that in a case that more than 4 sPDSCHs are time-multiplexed in a single subframe, the two PUCCH formats 1b may correspond to more than 4 sPDSCHs by time-multiplexing the two PUCCH format 1b with a channel selection.

In a case that a PUCCH format 2 is configured for an sTTI, and, in addition, in a case that a single serving cell (a single FDD cell) is configured, the PUCCH format 2 may be used for transmitting an HARQ-ACK of up to 10. In a case that, for instance, 7 sPDSCHs are time-multiplexed in a single subframe, the PUCCH format 2 may be used for transmitting the HARQ-ACK corresponding to each. For the sTTI, only the PUCCH format 2 may be supported. In a case that 7-symbol sTTI is configured for the PUCCH format 2, the PUCCH format 2 may be used for transmitting an HARQ-ACK of up to 5 bits.

In a case that the PUCCH format 2a is configured for an sTTI, and in addition, in a case that a single serving cell (a single FDD cell) is configured, the PUCCH format 2a may be used for transmitting HARQ-ACK of up to 11 bits. In a case that, for instance, 7 sPDSCHs are time-multiplexed in a single subframe, the PUCCH format 2a may be used for transmitting the HARQ-ACK corresponding to each. For the sTTI, only the PUCCH format 2a may be supported. In a case that 7-symbol sTTI is configured for the PUCCH format 2a, the PUCCH format 2a may be used for transmitting an HARQ-ACK of up to 6 bits.

In a case that the PUCCH format 2b is configured for an sTTI and in addition, in a case that a single serving cell is configured, the PUCCH format 2b may be used for transmitting an HARQ-ACK of up to 12 bits. In a case that, for instance, 7 sPDSCHs are time-multiplexed in a single subframe, the PUCCH format 2b may be used for transmitting the HARQ-ACK corresponding to each. For the sTTI, only the PUCCH format 2b may be supported. In a case that 7-symbol sTTI is configured for the PUCCH format 2b, the PUCCH format 2b may be used for transmitting an HARQ-ACK of up to 7 bits.

In a case that the PUCCH format 2/2a/2b is constituted of 7 symbols, frequency hopping in a single subframe may be supported. Whether to perform frequency hopping in a 7-symbol PUCCH format 2/2a/2b may be determined based on a certain higher layer parameter.

By changing the interpretation of the PUCCH format, the transmission of an HARQ-ACK for an sPDSCH can be performed appropriately.

Next, procedures of the terminal apparatus and/or of the base station apparatus will be described for a case where the maximum value of the TA (timing advance, timing alignment) is limited by shortening the processing time of the terminal apparatus and/or the processing time of the base station apparatus.

The TA is used for adjusting the transmission timing of the terminal apparatus. The value of the TA (TA value, for short) is configured in the terminal apparatus by use of a TA command. Based on the configured TA value, the terminal apparatus performs the transmission by shifting the timing from the subframe boundary of the uplink subframe by an amount corresponding to the TA value. The TA value refers to the time difference between the transmission timing of the uplink radio frame i and the start of the corresponding downlink radio frame.

In a case that the processing time of the terminal apparatus and/or the processing time of the base station apparatus is shortened, and in addition, in a case that the TA value is a large value, processing time secured by the terminal apparatus from the reception of a downlink signal to the transmission of the corresponding uplink signal may not be sufficient and hence no uplink signal can be successfully transmitted.

The terminal apparatus and/or the base station apparatus can perform the configuration of the processing time and the configuration of the TTI length in accordance with the TA value by sharing the TA value measured by the terminal apparatus and/or the time difference between the reception and the transmission.

In a case that an event associated with the measurement of the time difference between the reception and the transmission (Rx-Tx time difference measurement) is configured, the terminal apparatus reports, to the base station apparatus, the result of the measurement of the time difference between the reception and the transmission based on the event.

Examples of such an event involving the measurement of the time difference between the reception and the transmission include the following.

In an event 1, in a case that the measurement result is greater than a prescribed first threshold $T_1$, the terminal apparatus reports the measurement result. In addition, in the event 1, in a case that the measurement result ranges from the prescribed first threshold $T_1$ to a prescribed second threshold $T_2$, the terminal apparatus may report the measurement result. The prescribed first threshold $T_1$ and/or the prescribed second threshold $T_2$ may be configured as a higher layer parameter. It should be noted that the prescribed second threshold $T_2$ may be smaller than the maximum value of TA. In a case that the measurement result is greater than the prescribed second threshold $T_2$, the terminal apparatus may notify the base station apparatus of the measurement result by use of a PRACH and/or a higher-layer signal.

In an event 2, in a case that the previous measurement result and/or the next measurement result is different from the prescribed value, the terminal apparatus reports the previous or the next measurement result. Alternatively, the prescribed value may be configured as a higher-layer parameter. For instance, the previous measurement result (first measurement result) may be the measurement result that was reported (for the last time) before the value was changed to the prescribed value, or may be the measurement result that is immediately before the value was changed from the prescribed value. The next measurement result (second measurement result) may be the measurement result after (immediately after) it was changed to a prescribed value in a case that the next measurement result is compared with the first measurement result.

In an event 3, in a case that the TTI length is changed, the measurement result before (immediately before) the TTI length is changed and/or the measurement result after (immediately after) the TTI length is changed may be reported.

In an event 4, in a case that the TTI length is configured or reconfigured via the higher layer signalling or the L1 signalling (DCI format), the measurement result before (immediately before) the TTI length is configured and/or the measurement result after (immediately after) the TTI length is configured may be reported.

In an event 5, the measurement result may be reported in accordance with the report interval configured as a higher layer parameter. In a case that there are multiple measurement results in a report interval, the average measurement result of the measurement results in that report interval or the last measurement result immediately before the reporting may be reported.

In addition, the result of measurement of the time difference between the reception and the transmission may be reported based on a value set in a field included in the DCI format.

In a case that a field requiring a report of a measurement result is added to the DCI format, and in addition, in a case that the field indicates that a report is required, the terminal apparatus may report the measurement result by use of a PUSCH and/or an sPUSCH.

In addition, in a case that a field requiring a report of a measurement result is added to the DCI format, and in addition, in a case that the field indicates that a report is required, the terminal apparatus may report information (e.g., 1-bit information) indicating whether the measurement result is close to the prescribed threshold. The prescribed threshold may be configured as a higher-layer parameter.

Next, procedures of the terminal apparatus and/or of the base station apparatus will be described for a case where the maximum value of TA is not limited irrespective of whether the processing time of the terminal apparatus and/or the processing time of the base station apparatus is shortened.

Based on the TA value, the base station apparatus may add an uplink delay field in a certain DCI format by considering a case that the terminal apparatus is capable of transmitting no uplink signal. The certain DCI format may be the DCI format associated with the transmission of the sPUCCH, the DCI format associated with the transmission of the sPUSCH, or the DCI format associated with the transmission of the sPRACH.

In a case that the TA value to be transmitted by use of a TA command is greater than a prescribed value, the base station apparatus may set the value of the uplink delay field to a value corresponding to the prescribed number of symbols. The terminal apparatus may delay the transmission of the uplink signal by a time corresponding to the number of prescribed symbols having been notified of.

Whether an uplink delay field is added to the DCI format may be determined based on a certain higher layer parameter.

The value of the uplink delay field may be configured as a higher layer parameter.

The value of the uplink delay field may be determined based on a value set in the TA command.

A communicable range (communication area) at each frequency controlled by a base station apparatus is regarded as a cell. Here, the communication area covered by the base station apparatus may be different in size and shape for each frequency. Moreover, the covered area may be different for each frequency. A radio network, in which cells having different types of base station apparatuses or different cell radii are located in a mixed manner in the area with the same frequency and/or different frequencies to form a single communication system, is referred to as a heterogeneous network.

A terminal apparatus has no connection with any network, for example, immediately after being powered on (e.g., upon activation). Such a state with no connection is referred to as an idle mode (RRC_IDLE). To perform communication, the terminal apparatus in the idle mode needs to establish a connection with any network. To put it differently, the terminal apparatus needs to be in the connected mode (RRC_CONNECTED). Here, a network may include a base station apparatus, an access point, a network server, a modem, and the like that belong to the network.

The terminal apparatus and the base station apparatus may employ a technique for aggregating the frequencies (component carriers or frequency bands) of multiple different frequency bands through CA and for treating the aggregated frequencies as a single frequency (frequency band). A component carrier includes an uplink component carrier corresponding to the uplink (uplink cell) and a downlink component carrier corresponding to the downlink (downlink cell). In each embodiment of the present invention, "frequency" and "frequency band" may be used synonymously.

For example, in a case that five component carriers having frequency bandwidths of 20 MHz are aggregated through CA, a terminal apparatus capable of performing CA may perform transmission and/or reception by assuming that the aggregated carriers have a frequency bandwidth of 100

MHz. Note that component carriers to be aggregated may have contiguous frequencies or partially discontiguous frequencies. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band. The terminal apparatus and/or the base station apparatus may perform simultaneously the transmission and/or the reception by use of the component carrier (component carrier corresponding to the cell) belonging to those operating band.

It is also possible to aggregate multiple contiguous or discontiguous component carriers of the same frequency bands. The frequency bandwidth of each component carrier may be a narrower frequency bandwidth (e.g., 5 MHz or 10 MHz) than the receivable frequency bandwidth (e.g., 20 MHz) of the terminal apparatus, and the frequency bandwidths to be aggregated may be different from each other. The terminal apparatus and/or the base station apparatus having an NX function may support both the cells having a backward compatibility with the LTE cell and the cells having no such backward compatibility.

Moreover, the terminal apparatus and/or the base station apparatus having an LR function may aggregate multiple component carriers (carrier types, cells) having no backward compatibility with the LTE may be aggregated. Note that the number of uplink component carriers to be allocated to (configured for or added for) the terminal apparatus by the base station apparatus may be the same as or may be fewer than the number of downlink component carriers.

A cell constituted by an uplink component carrier in which an uplink control channel is configured for a radio resource request and a downlink component carrier having a cell-specific connection with the uplink component carrier is referred to as a PCell. A cell constituted by component carriers other than the component carriers of the PCell is referred to as an SCell. The terminal apparatus receives a paging message, detects update of broadcast information, carries out an initial access procedure, configures security information, and the like in a PCell, and does not have to perform these operations in the SCell.

The PCell is not subject to activation and deactivation control (in other words, regarded as being always activated), whereas the SCell has activated and deactivated states, the change of which is explicitly specified by the base station apparatus or is made on the basis of a timer configured for the terminal apparatus for each component carrier. A PCell and an SCell are collectively referred to as a serving cell.

In a case that the terminal apparatus and/or the base station apparatus supporting both the LTE cell and the LR cell performs communications by use of an LTE cell and an LR cell, a cell group associated with the LTE cells and a cell group associated with the LR cell may be formed. To put it differently, in each of the cell groups associated with the LTE cells and with the LR cells, a cell corresponding to the PCell may be included.

Carrier aggregation is communications that use multiple component carriers (frequency bands) using multiple cells, and is also referred to as cell aggregation. The terminal apparatus may have a radio connection (RRC connection) with the base station apparatus via a relay station device (or a repeater) for each frequency. In other words, a base station apparatus in the present embodiment may be replaced with a relay station device.

The base station apparatus manages a cell, which corresponds to an area where terminal apparatuses can communicate with the base station apparatus, for each frequency. A single base station apparatus may manage multiple cells. Cells are classified into multiple types of cells depending on the size of the area (cell size) that allows for communication with terminal apparatuses. For example, cells are classified into macro cells and small cells. Moreover, small cells are classified into femto cells, pico cells, and nano cells depending on the size of the area. In a case that a terminal apparatus is capable of communicating with a certain base station apparatus, a cell configured to be used for the communication with the terminal apparatus is referred to as a serving cell, while the other cells that are not used for the communication are referred to as neighboring cells, among the cells of the base station apparatus.

In other words, in CA, multiple serving cells thus configured include one PCell and one or more SCells.

The PCell is a serving cell in which an initial connection establishment procedure (RRC connection establishment procedure) has been performed, a serving cell in which a connection re-establishment procedure (RRC connection reestablishment procedure) has been started, or a cell that has been indicated as a PCell in a handover procedure. The PCell operates at a primary frequency. At a time point when a connection is (re)established, or after such a time point, an SCell may be configured. Each SCell operates at a secondary frequency. The connection may be referred to as an RRC connection. For the terminal apparatus supporting CA, a single PCell and one or more SCells may be aggregated.

In a case that the terminal apparatus is configured with more than one serving cell or is configured with a secondary cell group, the terminal apparatus holds, for each serving cell, a received soft channel bit corresponding to at least a predefined range in response to a decoding failure in code blocks of a transport block for at least a predefined number of transport blocks.

An LAA terminal may support a function corresponding to two or more radio access technologies (RATs).

The LAA terminal supports two or more operating bands. Hence, the LAA terminal supports a function associated with the CA.

Furthermore, the LAA terminal may support time division duplex (TDD) and half duplex frequency division duplex (HD-FDD). In addition, the LAA terminal may support full duplex FDD (FD-FDD). The LAA terminal may indicate which duplex mode/frame structure type is supported, via higher layer signaling such as capability information.

Moreover, the LAA terminal may serve as an LTE terminal of category X (X is a prescribed value). To put it differently, in the LAA terminal, the maximum bit number of transport blocks transmittable/receivable in a single Transmission Time Interval (TTI) may be expanded. In the LTE, one TTI corresponds to one subframe.

Note that in each embodiment of the present invention, TTI and subframe may be defined individually.

In addition, the LAA terminal may support multiple duplex modes/frame structure types.

A frame structure type 1 is applicable to both FD-FDD and HD-FDD. In the FDD, 10 subframes can be used for each of downlink transmission and uplink transmission at every 10-ms intervals. Moreover, the uplink transmission and the downlink transmission are separated in the frequency domain. In an HD-FDD operation, the terminal apparatus cannot perform transmission and reception at the same time, but in an FD-FDD operation, there is no such a limitation.

The higher layer signaling may configure a retuning time (the time necessary for the tuning (the number of subframes or symbols)), in a case that the frequency hopping changes and the used frequency changes.

For example, in the LAA terminal, the number of downlink transmission modes (PDSCH transmission modes) to be supported may be reduced. To put it differently, in a case that the number of downlink transmission modes or a downlink transmission mode supported by the LAA terminal is indicated as the capability information from the LAA terminal, the base station apparatus configures the downlink transmission mode, based on the capability information. Note that in a case that a parameter for a downlink transmission mode that is not supported by the LAA terminal is configured, the LAA terminal may ignore the configuration. To put it differently, the LAA terminal does not have to perform processing for the downlink transmission mode that is not supported. Here, the downlink transmission mode is used to indicate a transmission scheme of the PDSCH corresponding to the PDCCH/EPDCCH, based on a configured downlink transmission mode, the type of RNTI, a DCI format, or a search space. The terminal apparatus learns, for example, whether the PDSCH is transmitted through an antenna port 0, transmitted through the transmit diversity scheme, or transmitted through multiple antenna ports, based on such pieces of information. The terminal apparatus can properly perform a reception process, based on the pieces of information. Even in a case that the DCI related to the PDSCH resource allocation is detected from the same type of DCI format, in a case that the downlink transmission mode or the type of RNTI is different, the PDSCH is not always transmitted through the same transmission scheme.

In a case that the terminal apparatus supports a function relating to simultaneous transmission of a PUCCH and a PUSCH, and the terminal apparatus supports a function relating to repeated transmission of a PUSCH and/or repeated transmission of a PUCCH, the PUCCH and the PUSCH may be transmitted repeatedly a predefined number of times, at a timing when the PUSCH transmission is performed or at a timing when the PUCCH transmission is performed. To put it differently, the PUCCH and the PUSCH may be transmitted at the same time (i.e., in the same subframe).

In such a case, the PUCCH may include a CSI report, an HARQ-ACK, and an SR.

All signals are transmittable and receivable in a PCell, but some signals may be not transmittable or receivable in an SCell. For example, a PUCCH is transmitted only in a PCell. In addition, unless multiple timing advance groups (TAGs) are configured for the cells, a PRACH is transmitted only in a PCell. In addition, a PBCH is transmitted only in a PCell. In addition, an MIB is transmitted only in a PCell. However, in a case that a terminal apparatus supports a function of transmitting a PUCCH and an MIB in an SCell, a base station apparatus may instruct the terminal apparatus to transmit a PUCCH and/or an MIB in the SCell (at a frequency corresponding to the SCell). To put it differently, in the case that the terminal apparatus supports the function, the base station apparatus may configure, for the terminal apparatus, a parameter for transmitting a PUCCH and an MIB in the SCell.

In a PCell, a radio link failure (RLF) is detected. In an SCell, even in a case that conditions for detection of an RLF are met, the detection of the RLF is not recognized. In a lower layer of the PCell, in a case that conditions for an RLF are satisfied, the lower layer of the PCell notifies a higher layer of the PCell of the fact that the conditions for an RLF are satisfied. Semi-persistent scheduling (SPS) or discontinuous transmission (DRX) may be performed in a PCell. In an SCell, the same DRX as the DRX in a PCell may be performed. In an SCell, MAC configuration information/parameters are basically shared with the PCell of the same cell group. Some of the parameters (e.g., sTAG-Id) may be configured for each SCell. Some of timers or counters may be applied to the PCell only. A timer or a counter applied to the SCell only may be configured.

Figure 5:
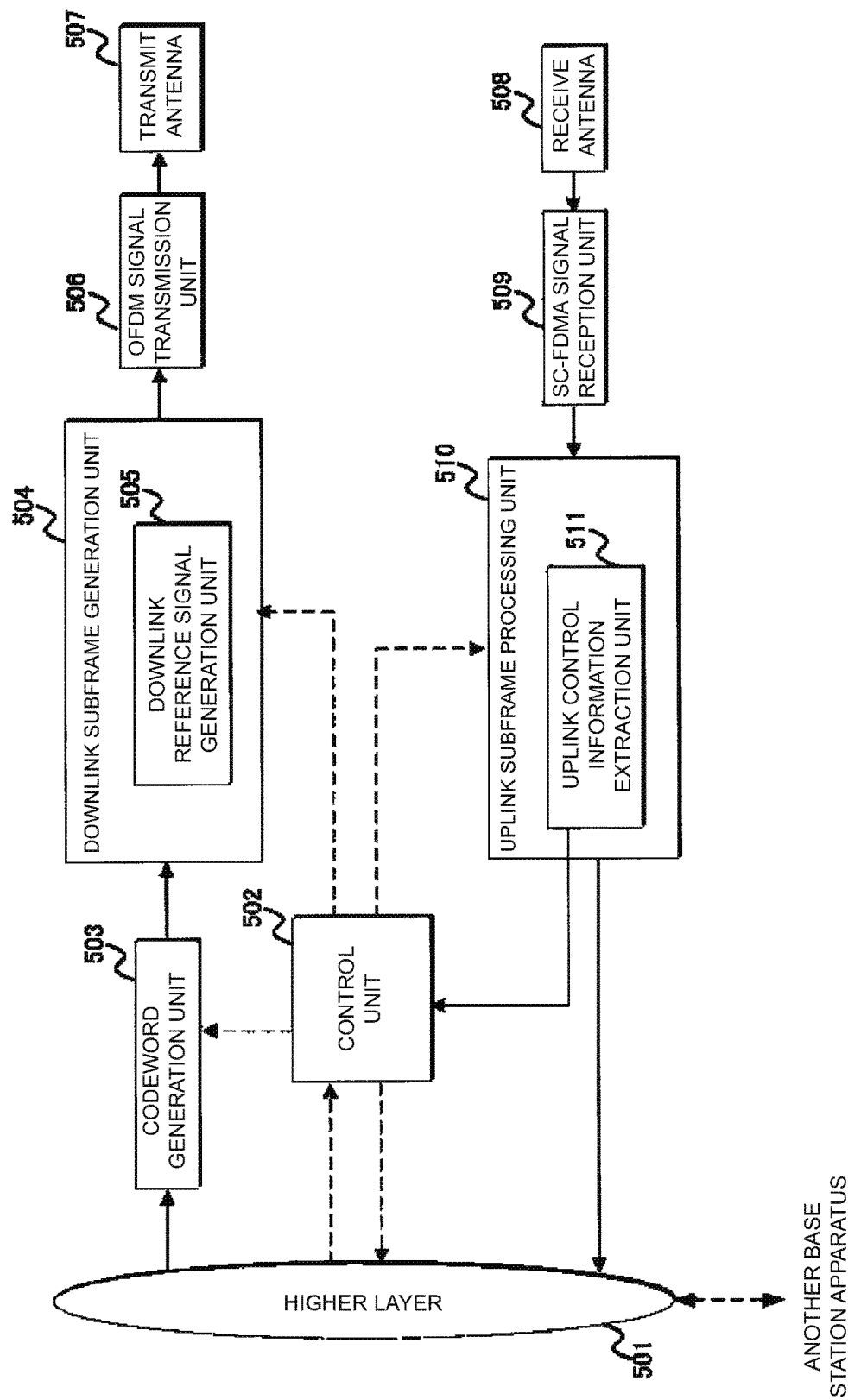
FIG. 5 is a diagram illustrating an example of a block configuration of a base station apparatus according to the first embodiment.

FIG. 5 is a schematic diagram illustrating an exemplar block configuration of a base station apparatus 2 according to the present embodiment. The base station apparatus 2 includes a higher layer (higher-layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (channel state measurement unit and/or CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit/HARQ-ACK acquisition unit/SR acquisition unit) 511. It should be noted that the SC-FDMA signal reception unit 509 serves also as a measurement unit for measuring a reception signal, a CCA, and/or an interference noise power. It should be noted that the SC-FDMA signal reception unit may be an OFDM signal reception unit or may include an OFDM signal reception unit in a case that the terminal apparatus supports the transmission of the OFDM signal. It should be noted that the downlink subframe generation unit may be a downlink TTI generation unit or may include a downlink TTI generation unit. The downlink TTI generation unit may be a generation unit for generating a physical channel and/or a physical signal that the downlink TTI is constituted of. It should be noted that the similar description to the one above may apply to the uplink as well. It should be noted that though not illustrated, the base station apparatus may include a transmitter for transmitting a TA command. In addition, the base station apparatus may include a receiver for receiving the measurement result of the time difference between the reception and the transmission reported from the terminal apparatus.

Figure 6:
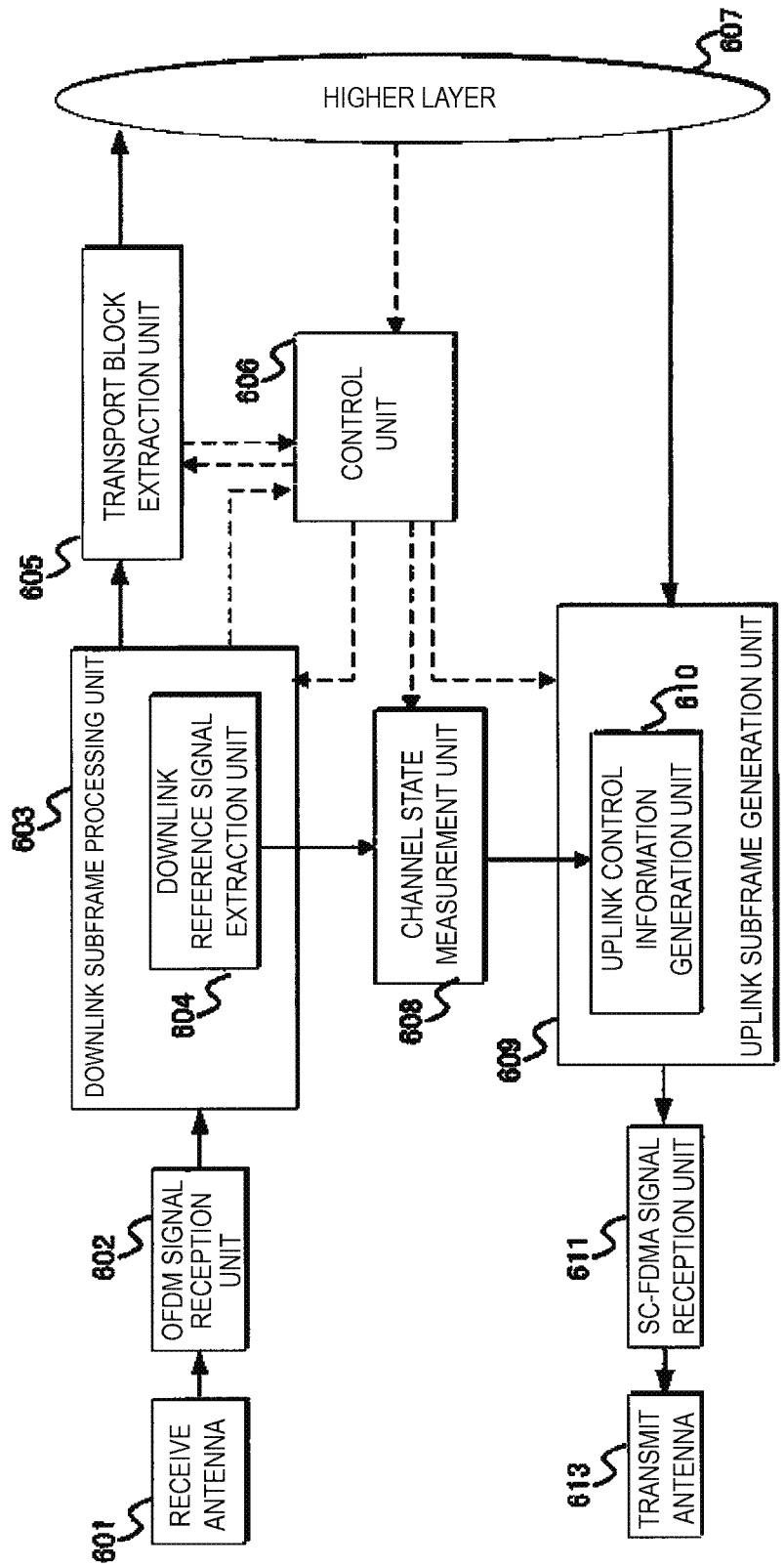
FIG. 6 is a diagram illustrating an example of a block configuration of a terminal apparatus according to the first embodiment.

FIG. 6 is a schematic diagram illustrating an exemplar block configuration of the terminal apparatus 1 according to the present embodiment. The terminal apparatus 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610. It should be noted that the OFDM signal reception unit 602 serves also as a measurement unit for measuring a reception signal, a CCA, and/or an interference noise power. Hence, the OFDM signal reception unit 602 may perform an RRM measurement. In a case that the terminal apparatus supports the transmission of the OFDM signal, the SC-FDMA signal transmission unit may be an OFDM signal transmission unit or may include an OFDM signal transmission unit. It should be noted that the uplink subframe generation unit may be an uplink TTI generation unit or may include an uplink TTI generation unit. In addition, the terminal apparatus may include a power control unit configured to control/set the transmission power for the uplink signal. It should be noted that though not illustrated, the terminal apparatus may include a measurement unit configured to measure the time difference between the reception and the transmission by the terminal apparatus. In addition, the terminal apparatus may include a transmitter configured to report the measurement result of the time difference.

In each of FIG. 5 and FIG. 6, higher layers may include a medium access control (MAC) layer, a radio link control (RLC) layer, a packet data convergence protocol (PDCP) layer, and a radio resource control (RRC) layer.

The RLC layer transmits to the higher layers: transparent mode (TM) data, unacknowledged mode (UM) data, and acknowledged mode (AM) data including an indication indicating that packet data unit (PDU) transmission by the higher layer has been done successfully. Further, the RLC layer transmits data, and notifies a transmission opportunity with a whole size of the RLC PDU transmitted in a transmission opportunity to the lower layers.

The RLC layer supports: a function associated with transmission of the higher layer PDU, a function associated with an error correction with the automatic repeat request (ARQ) (only for the AM data transmission), a function associated with combination/division/reconstruction of a RLC service data unit (SDU) (only for the UM and AM data transmission), a function associated with redivision of the RLC data PDU (for the AM data transmission), a function associated with sorting of the RLC data PDU (only for the AM data transmission), a function associated with overlap detection (only for the UM and AM data transmission), a function associated with abandonment of the RLC SDU (only for the UM and AM data transmission), a function associated with RLC re-establishment, and a function associated with protocol error detection (only for the AM data transmission).

First, a flow of downlink data transmission and reception will be described by using FIG. 5 and FIG. 6. In the base station apparatus 2, the control unit 502 holds a modulation and coding scheme (MCS) indicating a modulation scheme, a coding rate, and the like in the downlink, downlink resource allocation indicating RBs to be used for data transmission, and information to be used for HARQ control (a redundancy version, an HARQ process number, and a new data indicator (NDI)) and controls the codeword generation unit 503 and downlink subframe generation unit 504 based on these elements. Downlink data (also referred to as a downlink transport block, DL-SCH data, or DL-SCH transport block) transmitted from the higher layer 501 is processed through error correction coding, rate matching, and the like in the codeword generation unit 503, under the control of the control unit 502, and a codeword is then generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as phase shift keying (PSK) modulation or quadrature amplitude modulation (QAM). Moreover, a modulation symbol sequence is mapped onto REs of some RBs, and a downlink subframe for each antenna port is generated through a precoding process. In this operation, a transmission data sequence transmitted from the higher layer 501 includes higher-layer control information, which is control information on the higher layer (e.g., dedicated (individual) radio resource control (RRC) signaling). Moreover, in the downlink reference signal generation unit 505, a downlink reference signal is generated. The downlink subframe generation unit 504 maps the downlink reference signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed in a case that downlink subframes are transmitted on multiple antenna ports. Moreover, the downlink subframe generation unit 504 may also have the capability of generating physical-layer downlink control channels, such as a PDCCH and an EPDCCH, or a control channel/a shared channel corresponding to a PDCCH and an EPDCCH, and of mapping the generated channels to the REs in downlink subframes. Multiple base station apparatuses transmit discrete downlink subframes.

In the terminal apparatus 1, an OFDM signal is received by the OFDM signal reception unit 602 via the receive antenna 601, and an OFDM demodulation process is performed on the signal.

The downlink subframe processing unit 603 first detects physical-layer downlink control channels, such as a PDCCH and an EPDCCH, or a control channel corresponding to a PDCCH and an EPDCCH. More specifically, the downlink subframe processing unit 603 decodes signals by assuming that a PDCCH and an EPDCCH, or a control channel corresponding to a PDCCH and an EPDCCH have been transmitted in the regions to which a PDCCH and an EPDCCH, or a control channel and a shared channel corresponding to a PDCCH and an EPDCCH can be allocated, and checks Cyclic Redundancy Check (CRC) bits added beforehand (blind decoding). In other words, the downlink subframe processing unit 603 monitors a PDCCH and an EPDCCH, or a control channel and a shared channel corresponding to a PDCCH and an EPDCCH. In a case that the CRC bits match an ID (a user-equipment-specific identifier (UEID) assigned to a single terminal, such as a cell-radio network temporary identifier (C-RNTI) or a semi-persistent scheduling-C-RNTI (SPS-C-RNTI), or a temporary C-RNTI) assigned by the base station apparatus beforehand, the downlink subframe processing unit 603 recognizes that a PDCCH or an EPDCCH, or a control channel and a shared channel corresponding to a PDCCH and a EPDCCH has been detected and extracts a PDSCH or a data channel/shared channel corresponding a PDSCH by using control information included in the detected PDCCH or EPDCCH or the control channel corresponding to the PDCCH and the EPDCCH.

The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 controls the downlink subframe generation unit 504 to carry out an RE demapping process, a demodulation process, and the like, corresponding to an RE mapping process and a modulation process. The PDSCH extracted from the received downlink subframe is transmitted to the transport block extraction unit 605. The downlink reference signal extraction unit 604 in the downlink subframe processing unit 603 extracts the DLRS from the downlink subframe.

In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes the higher-layer control information, and the higher layer 607 notifies the control unit 606 of a necessary physical-layer parameter based on the higher-layer control information. The plurality of base station apparatuses 2 each transmit separate downlink subframes, and the terminal apparatus 1 receives the downlink subframes. Hence, the above-described processes may be carried out for the downlink subframe of each of the plurality of base station apparatuses 2. In this situation, the terminal apparatus 1 may recognize or does not have to recognize that multiple downlink subframes have been transmitted from the plurality of base station apparatuses 2. In a case that the terminal apparatus 1 does not recognize the subframes, the terminal apparatus 1 may simply recognize that multiple downlink subframes have been transmitted in multiple cells. In addition, the transport block extraction unit 605 determines whether the transport block has been detected correctly. The transport block extraction unit 605 then transmits the determination result to the control unit 606.

Here, the transport block extraction unit 605 may include a buffer portion (soft buffer portion). In the buffer portion, information on the extracted transport block can be stored temporarily. For example, in a case that the same transport block (retransmitted transport block) is received, and in addition in a case that the decoding of data for this transport block is not successful, the transport block extraction unit 605 combines (composes) newly received data with the data for this transport block temporarily stored in the buffer portion, and attempts to decode the combined data. In a case that the temporarily-stored data becomes unnecessary or in a case that a predefined condition is satisfied, the buffer portion flushes the data. A condition for data to be flushed differs depending on the type of transport block corresponding to the data. The buffer portion may be prepared for each data type. For example, as the buffer portion, a message-3 buffer or an HARQ buffer may be prepared, or a buffer portion may be prepared for each layer, L1/L2/L3. Note that flushing information/data includes flushing a buffer in which information and data are stored.

Next, a flow of uplink signal transmission and/or reception will be described. In the terminal apparatus 1, a downlink reference signal extracted by the downlink reference signal extraction unit 604 is transmitted to the channel state measurement unit 608 under an instruction from the control unit 606, the channel state and/or interference is measured in the channel state measurement unit 608, and furthermore, the CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and map the resultant to a downlink subframe based on the determination result of whether the transport block is correctly detected.

The terminal apparatus 1 performs these processes on the downlink subframe of each of multiple cells. In the uplink control information generation unit 610, a PUCCH including the calculated CSI and/or HARQ-ACK is generated, or a control channel/shared channel corresponding to the PUCCH is generated. In the uplink subframe generation unit 609, the PUSCH or data channel/shared channel corresponding to the PUSCH and including the uplink data transmitted from the higher layer 607 as well as the PUCCH or the control channel generated by the uplink control information generation unit 610 are mapped to the RBs in an uplink subframe to generate an uplink subframe.

The SC-FDMA signal reception unit 509 receives an SC-FDMA signal through the receive antenna 508, and performs an SC-FDMA demodulation process on the signal. In the uplink subframe processing unit 510, the control unit 502 instructs extraction of RBs, to which the PUCCH is mapped, and instructs the uplink control information extraction unit 511 to extract the CSI included in the PUCCH. The extracted CSI is transmitted to the control unit 502. The CSI is used for controlling downlink transmission parameters (MCS, downlink resource allocation, HARQ, and the like) by the control unit 502. It should be noted that the SC-FDMA signal reception unit may be an OFDM signal reception unit. In addition, the SC-FDMA signal reception unit may include an OFDM signal reception unit.

The base station apparatus assumes a maximum output power $P_{CMAX}$ configured by the terminal apparatus from a power headroom report, and assumes an upper limit value of the power for each physical uplink channel, based on the physical uplink channel received from the terminal apparatus. The base station apparatus determines a transmit power control command value for a physical uplink channel, based on the above assumptions, and transmits the value to the terminal apparatus on a PDCCH along with a downlink control information format. The above operations achieve a power adjustment for the transmit power of the physical uplink channel/signal (or uplink physical channel/physical signal) transmitted from the terminal apparatus.

In a case that the base station apparatus transmits the PDCCH (EPDCCH)/PDSCH (or LR cell shared channel/control channel corresponding to them) to the terminal apparatus, the base station apparatus allocates the PDCCH/PDSCH resources to prevent an allocation of the PBCH (or the broadcast channel corresponding to the PBCH) resource.

The PDSCH may be used for transmitting the respective messages/information related to SIB/RAR/paging/unicast for the terminal apparatus.

The frequency hopping for the PUSCH may be separately configured according to a grant type. For example, parameter values used for the frequency hopping in the PUSCH corresponding to each of a dynamic schedule grant, a semi-persistent grant, and an RAR grant may be separately configured. These parameters may not be indicated in the uplink grant. Further, these parameters may be configured through the higher layer signaling including the system information.

The above-described various parameters may be configured for each physical channel. Further, the above-described various parameters may be configured for each terminal apparatus. Further, the above-described parameters may be configured commonly for the terminal apparatuses. Here, the above-described various parameters may be configured by using the system information. Further, the above-described various parameters may be configured by using the higher layer signaling (RRC signaling, MAC CE). Further, the above-described various parameters may be configured by using the PDCCH/EPDCCH. The above-described various parameters may be configured as broadcast information. Further, the above-described various parameters may be configured as unicast information.

Note that, in the above-described embodiments, the power value demanded in each PUSCH transmission has been described as calculated based on: parameters configured by higher layers; an adjustment value determined by the number of PRBs allocated to the PUSCH transmission by a resource assignment; a downlink path loss and a coefficient by which the path loss is multiplied; an adjustment value determined by a parameter indicating an offset of the MCS applied to UCI; a correction value obtained by a TPC command, and the like. Moreover, descriptions have been given where the power value demanded by each PUCCH transmission is calculated based on: a parameter configured by a higher layer; a downlink path loss; an adjustment value determined by the UCI transmitted by the PUCCH; an adjustment value determined by the PUCCH format; an adjustment value determined by the antenna port number used for the PUCCH transmission; the value based on the TPC command, and the like. However, the calculation of the power value is not limited to the above descriptions. An upper limit value may be set for the demanded power value, and the smallest value of the value based on the above-described parameters and the upper limit value (e.g., $P_{CMAX, c}$, which is the maximum output power value of a serving cell c) may be used as the demanded power value.

A program running on each of the base station apparatus and the terminal apparatus according to an aspect of the present invention may be a program for controlling a Central Processing Unit (CPU) and the like (a program for causing a computer to operate) to enable the functions in the above-described embodiments according to an aspect of the present invention. The information exchanged between these devices is temporarily stored in a Random Access Memory (RAM) while being processed. Subsequently, the information is stored in various types of Read Only Memory (ROM) such as a flash ROM and a Hard Disk Drive (HDD), and is read by the CPU to be modified or rewritten, as appropriate.

Moreover, the terminal apparatus and/or the base station apparatus in the above-described embodiments may be partially achieved by a computer. In such a case, a program for realizing such control functions may be recorded on a computer-readable recording medium to cause a computer system to read the program recorded on the recording medium for execution.

Note that "computer system" serves as a computer system built into a terminal apparatus or a base station apparatus, and such a computer system may include an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, "computer-readable recording medium" may include a medium that dynamically retains a program for a short period of time, such as a communication line that is used to transmit the program over a network such as the Internet or over a communication line such as a telephone line, and may include a medium that retains a program for a given period of time, such as a volatile memory within the computer system that functions as a server or a client in such a case. Furthermore, the above-described program may be configured to realize some of the functions described above, and additionally may be configured to realize the functions described above, in combination with a program already recorded in the computer system.

Furthermore, the base station apparatus in the above-described embodiments can be achieved as an aggregation (a device group) including multiple devices. Devices constituting such a device group may be each equipped with some or all portions of each function or each functional block of the base station apparatus in the above-described embodiments. As the device group, at least general functions or general functional blocks of the base station apparatus may be provided. Furthermore, the terminal apparatus in the above-described embodiments can also communicate with the base station apparatus as an aggregate.

Furthermore, the base station apparatus in the above-described embodiments may be an evolved universal terrestrial radio access network (EUTRAN). Furthermore, the base station apparatus 2 in the above-described embodiments may have some or all portions of the function of a higher node than an eNodeB.

Furthermore, some or all portions of each of the terminal apparatus and the base station apparatus in the above-described embodiments may be achieved as an LSI, which is a typical integrated circuit, or may be achieved as a chip set. The functional blocks of the terminal apparatus and the base station apparatus may be individually achieved as a chip, or some or all of the functional blocks may be integrated into a chip. The circuit integration technique is not limited to LSI, and may be achieved as a special circuit or a multi-purpose processor. Furthermore, in a case that with advances in semiconductor technology, a circuit integration technology with which an LSI is replaced appears, it is also possible to use an integrated circuit based on the technology.

Furthermore, in the above-described embodiments, a cellular mobile station device (cellular phone, portable terminal) has been described as one example of a terminal apparatus or a communication device. However, the present invention is not limited to this, and is applicable to a fixed-type electronic apparatus installed indoors or outdoors, or a stationary-type electronic apparatus, for example, a terminal apparatus or a communication device, such as an Audio-Video (AV) apparatus, a kitchen appliance (e.g., a refrigerator, a microwave oven), a cleaning or washing machine, an air-conditioning apparatus, office equipment, a vending machine, vehicle loading machine for car navigation or the like, and other household apparatuses.

From the foregoing, an aspect of the present invention provides the following characteristics.

(1) A terminal apparatus according to an aspect of the present invention is a terminal apparatus for communicating with a base station apparatus, the terminal apparatus including: a receiver configured to receive a Physical Downlink Shared Channel (PDSCH); and a transmitter configured to transmit a Hybrid Auto Repeat request-acknowledgement (HARQ-ACK) for the PDSCH by use of a Physical Uplink Control Channel (PUCCH), wherein the transmitter shortens a timing for transmitting the HARQ-ACK for the PDSCH based on a prescribed Transmission Time Interval (TTI) length configured for the PDSCH, and a PUCCH format to transmit the HARQ-ACK is determined based on the TTI length of the PDSCH and the TTI length of the PUCCH.

(2) A terminal apparatus according to an aspect of the present invention is the above-described terminal apparatus, wherein in a case that in a subframe n, the HARQ-ACK for the PDSCH is transmitted by use of the PUCCH, the total number of the HARQ-ACKs included in the PUCCH may preferably be determined based on the TTI length of the PDSCH in a subframe n−k.

(3) A terminal apparatus according to an aspect of the present invention is the above-described terminal apparatus, wherein in a case that the TTI length for the PDSCH and the TTI length for the PUCCH are different from each other, the HARQ-ACK for the PDSCH may preferably be transmitted by use of a PUCCH format configured based on a higher layer parameter.

(4) A method according to an aspect of the present invention is a method employed by the above-described terminal apparatus for communicating with a base station apparatus, the method including the steps of: receiving a Physical Downlink Shared Channel (PDSCH); transmitting a Hybrid Auto Repeat request-acknowledgement (HARQ-ACK) for the PDSCH by use of a Physical Uplink Control Channel (PUCCH); shortening a timing for transmitting the HARQ-ACK for the PDSCH based on a prescribed Transmission Time Interval (TTI) length configured for the PDSCH; and determining a PUCCH format to transmit the HARQ-ACK based on the TTI length of the PDSCH and the TTI length of the PUCCH.

(5) A terminal apparatus according to an aspect of the present invention is a terminal apparatus for communicating with a base station apparatus, the terminal apparatus including: a measurement unit configured to measure a time difference between reception and transmission by the terminal apparatus; a transmitter configured to report a measurement result of the time difference based on an event associated with the measurement of the time difference, wherein in a case that the prescribed TTI (Transmission Time Interval (TTI) length is configured, and in addition, in a case that the measurement result is greater than a prescribed threshold, the transmitter reports the measurement result to the terminal apparatus.

(6) A terminal apparatus according to an aspect of the present invention is the above-described terminal apparatus, wherein: in a case that a difference between a first measurement result and a second measurement result is greater than a prescribed value, the transmitter may preferably report the first measurement result and/or the second measurement result; the first measurement result may preferably a last measurement result reported before the measurement result changes by more than the prescribed value; the second measurement result may preferably be a measurement result immediately after the measurement result has changed from the first measurement result by more than the prescribed value.

(7) A terminal apparatus according to an aspect of the present invention is the above-described terminal apparatus, wherein: in a case that a TTI length is configured, the transmitter may preferably report the measurement result; and the TTI length may preferably be an uplink TTI length and/or a downlink TTI length.

(8) A method according to an aspect of the present invention is a method employed by a terminal apparatus for communicating with a base station apparatus, the method including the steps of: measuring a time difference between reception and transmission of the terminal apparatus; reporting a measurement result of the time difference based on an event associated with the measurement of the time difference; and reporting the measurement result to the terminal apparatus in a case that a prescribed Transmission Time Interval (TTI) length is configured and in addition, in a case that the measurement result is greater than a prescribed threshold.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications to an aspect of the present invention are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

INDUSTRIAL APPLICABILITY

An aspect of the present invention may be used, for instance, in communication systems, communication apparatuses (e.g., cellular phones, base station apparatuses, wireless LAN apparatuses, or sensor devices), integrated circuits (e.g., communication chip), programs, or the like applications.

REFERENCE SIGNS LIST

501 Higher layer
502 Control unit
503 Codeword generation unit
504 Downlink subframe generation unit
505 Downlink Reference Signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink Reference Signal extraction unit
605 Transport block extraction unit
606 Control unit
607 Higher layer
608 Channel state measurement unit
609 Uplink subframe generation unit
610 Uplink control information generation unit
611, 612 SC-FDMA signal transmission unit
613, 614 Transmit antenna

The invention claimed is:
1. A terminal apparatus for communicating with a base station apparatus, the terminal apparatus comprising:
a receiver that receives:
(i) a first Physical Uplink Control CHannel (PUCCH) configuration, a second PUCCH configuration and a first parameter indicating a Transmission Time Interval (TTI) length, the first PUCCH configuration including at least a second parameter associated with a PUCCH format, the second PUCCH configuration including at least a second parameter associated with a PUCCH format, and the second PUCCH configuration being used to configure a PUCCH supporting a TTI length shorter than a TTI length of a PUCCH configured by the first PUCCH configuration, and

(ii) a Downlink Control Information (DCI) format and a Physical Downlink Shared CHannel (PDSCH) scheduled by the DCI format; and a transmitter that transmits a PUCCH including a Hybrid Automatic Repeat Request Acknowledgement (HARQ-ACK) corresponding to the PDSCH; wherein the transmitter determines the PUCCH format of the PUCCH based on the first PUCCH configuration, the second PUCCH configuration, the one or more second parameters, the DCI format, and a bit count of the HARQ-ACK included in the PUCCH.

2. The terminal apparatus according to claim 1, wherein in a case that a PUCCH format for the PUCCH configured by the first PUCCH configuration is same as a PUCCH format for a PUCCH configured by the second PUCCH configuration, a format of a HARQ-ACK included in the PUCCH format for the PUCCH configured by the first PUCCH configuration is different from a format of a HARQ-ACK included in the PUCCH format for the PUCCH configured by the second PUCCH configuration.

3. The terminal apparatus according to claim 1, wherein the transmitter determines the TTI length of the PUCCH based on the first parameter and the DCI format.

4. A method employed by a terminal apparatus for communicating with a base station apparatus, the method comprising:

receiving a first Physical Uplink Control CHannel (PUCCH) configuration, a second PUCCH configuration, and a first parameter indicating a Transmission Time Interval (TTI) length, the first PUCCH configuration including at least a second parameter associated with a PUCCH format, the second PUCCH configuration including at least a second parameter associated with a PUCCH format, and the second PUCCH configuration being used to configure a PUCCH supporting a TTI length shorter than a TTI length of a PUCCH configured by the first PUCCH configuration;

receiving a Downlink Control Information (DCI) format and a Physical Downlink Shared CHannel (PDSCH) scheduled by the DCI format;

transmitting a PUCCH including a Hybrid Automatic Repeat Request Acknowledgement (HARQ-ACK) corresponding to the PDSCH; and determining the PUCCH format of the PUCCH based on the first PUCCH configuration, the second PUCCH configuration, the one or more second parameters, the DCI format, and a bit count of the HARQ-ACK bits included in the PUCCH.

5. The method according to claim 4, wherein in a case that a PUCCH format for the PUCCH configured by the first PUCCH configuration is same as a PUCCH format for a PUCCH configured by the second PUCCH configuration, a format of a HARQ-ACK included in the PUCCH format for the PUCCH configured by the first PUCCH configuration is different from a format of a HARQ-ACK included in the PUCCH format for the PUCCH configured by the second PUCCH configuration.

6. The method according to claim 4, further comprising determining the TTI length of the PUCCH based on the first parameter and the DCI format.

* * * * *